(12) United States Patent
Eash et al.

(10) Patent No.: US 10,379,388 B2
(45) Date of Patent: Aug. 13, 2019

(54) DIGITAL LIGHT PATH LENGTH MODULATION SYSTEMS

(71) Applicant: Avegant Corp., Belmont, CA (US)

(72) Inventors: Aaron Matthew Eash, San Francisco, CA (US); Allan Thomas Evans, San Francisco, CA (US); D. Scott Dewald, Dallas, TX (US); Andrew John Gross, Redwood City, CA (US); Eamon Han O'Connor, Emeryville, CA (US); Warren Cornelius Welch, III, Foster City, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 15/491,792

(22) Filed: Apr. 19, 2017

(65) Prior Publication Data
US 2018/0045985 A1 Feb. 15, 2018

Related U.S. Application Data

(63) Continuation-in-part of application No. 15/358,040, filed on Nov. 21, 2016, which is a (Continued)

(51) Int. Cl.
| | |
|---|---|
| G02F 1/01 | (2006.01) |
| G02B 5/30 | (2006.01) |
| G02B 27/28 | (2006.01) |

(52) U.S. Cl.
CPC .......... *G02F 1/0136* (2013.01); *G02B 5/3083* (2013.01); *G02B 27/283* (2013.01)

(58) Field of Classification Search
CPC ....... G02F 1/0136; G02F 1/01; G02B 5/3083; G02B 5/30; G02B 27/283; G02B 27/28
(Continued)

(56) References Cited

U.S. PATENT DOCUMENTS

| | | | |
|---|---|---|---|
| 3,586,416 | A | 6/1971 | Bitetto |
| 3,856,407 | A | 12/1974 | Takeda et al. |

(Continued)

FOREIGN PATENT DOCUMENTS

| | | |
|---|---|---|
| WO | 2012104839 A1 | 8/2012 |
| WO | 2012175939 A1 | 12/2012 |

(Continued)

OTHER PUBLICATIONS

Hu, Xinda et al., "High-resolution optical see-through multi-focal-plane head-mounted display using freeform optics," Opt. Express 22, 13896-13903 (2014).

(Continued)

*Primary Examiner* — William R Alexander
(74) *Attorney, Agent, or Firm* — HIPLegal LLP; Judith Szepesi

(57) ABSTRACT

A system to adjust light path length comprising a digital light path length modulator, the digital light path length modulator comprising a polarization modulator to receive polarized light and to modulate a polarization of some or all of the polarized light. The system further comprising an optical path length extender (OPLE) having an entry surface and an exit surface, to direct the light entering the OPLE with a first polarization through the entry surface and along a first light path through the OPLE to exit through the exit surface, and to direct the light entering the OPLE with a second polarization through the entry surface and along a second light path through the OPLE to exit through the exit surface, the second light path through the OPLE having a light path length two or more times longer than the first light path length through the OPLE.

20 Claims, 23 Drawing Sheets

Related U.S. Application Data continuation-in-part of application No. 15/335,298, filed on Oct. 26, 2016, now Pat. No. 10,187,634, and a continuation-in-part of application No. 15/236,101, filed on Aug. 12, 2016, and a continuation-in-part of application No. 15/236,101, filed on Aug. 12, 2016.

(58) Field of Classification Search
USPC .......................................................... 359/302
See application file for complete search history.

(56) References Cited

U.S. PATENT DOCUMENTS

| | | | |
|---|---|---|---|
| 4,670,744 A * | 6/1987 | Buzak | G02B 27/2264 345/6 |
| 5,610,765 A | 3/1997 | Colucci | |
| 5,751,243 A | 5/1998 | Turpin | |
| 6,515,801 B1 * | 2/2003 | Shimizu | G02B 27/0025 348/E9.027 |
| 6,580,078 B1 | 6/2003 | O'callaghan et al. | |
| 7,023,548 B2 * | 4/2006 | Pallingen | G01N 21/21 356/369 |
| 7,360,899 B2 | 4/2008 | McGuire, Jr. et al. | |
| 7,905,600 B2 | 3/2011 | Facius et al. | |
| 8,262,234 B2 | 9/2012 | Watanabe | |
| 8,755,113 B2 | 6/2014 | Gardner et al. | |
| 9,025,067 B2 | 5/2015 | Gray et al. | |
| 9,304,319 B2 | 4/2016 | Bar-Zeev et al. | |
| 9,494,805 B2 | 11/2016 | Ward et al. | |
| 9,588,270 B2 | 3/2017 | Merrill et al. | |
| 10,057,488 B2 * | 8/2018 | Evans | G02B 27/28 |
| 2002/0191300 A1 | 12/2002 | Neil | |
| 2003/0020925 A1 | 1/2003 | Patel et al. | |
| 2004/0156134 A1 | 8/2004 | Furuki et al. | |
| 2004/0263806 A1 | 12/2004 | Silverstein et al. | |
| 2005/0141076 A1 | 6/2005 | Bausenwein et al. | |
| 2006/0119951 A1 | 6/2006 | McGuire | |
| 2007/0030456 A1 | 2/2007 | Duncan et al. | |
| 2007/0030543 A1 | 2/2007 | Javidi et al. | |
| 2007/0139760 A1 | 6/2007 | Baker et al. | |
| 2007/0146638 A1 | 6/2007 | Ma et al. | |
| 2008/0130887 A1 | 6/2008 | Harvey et al. | |
| 2008/0174741 A1 | 7/2008 | Yanagisawa et al. | |
| 2009/0061505 A1 | 3/2009 | Hong et al. | |
| 2009/0061526 A1 | 3/2009 | Hong et al. | |
| 2009/0237785 A1 | 9/2009 | Bloom | |
| 2009/0244355 A1 | 10/2009 | Horie | |
| 2011/0032436 A1 | 2/2011 | Shimizu et al. | |
| 2011/0149245 A1 | 6/2011 | Barth et al. | |
| 2012/0075588 A1 | 3/2012 | Suga | |
| 2013/0070338 A1 * | 3/2013 | Gupta | G02B 27/0172 359/485.05 |
| 2013/0100376 A1 | 4/2013 | Sawado | |
| 2013/0222770 A1 | 8/2013 | Tomiyama | |
| 2013/0344445 A1 * | 12/2013 | Clube | G03F 7/70325 430/322 |
| 2014/0168035 A1 | 6/2014 | Luebke et al. | |
| 2014/0176818 A1 | 6/2014 | Watson et al. | |
| 2015/0061976 A1 | 3/2015 | Ferri | |
| 2015/0205126 A1 | 7/2015 | Schowengerdt | |
| 2015/0319342 A1 | 11/2015 | Schowengerdt | |
| 2016/0041390 A1 | 2/2016 | Poon et al. | |
| 2016/0041401 A1 | 2/2016 | Suga | |
| 2016/0077338 A1 | 3/2016 | Robbins et al. | |
| 2016/0131920 A1 | 5/2016 | Cook | |
| 2016/0195718 A1 | 7/2016 | Evans | |
| 2016/0225337 A1 | 8/2016 | Ek et al. | |
| 2016/0227195 A1 | 8/2016 | Venkataraman et al. | |
| 2016/0381352 A1 | 12/2016 | Palmer | |
| 2017/0038579 A1 | 2/2017 | Yeoh et al. | |
| 2017/0068103 A1 | 3/2017 | Huang et al. | |
| 2017/0075126 A1 | 3/2017 | Carls et al. | |
| 2017/0097507 A1 | 4/2017 | Yeoh et al. | |
| 2017/0146803 A1 * | 5/2017 | Kishigami | G02B 27/0179 |
| 2017/0160518 A1 | 6/2017 | Lanman et al. | |
| 2018/0045973 A1 * | 2/2018 | Evans | G02B 27/283 |
| 2018/0045974 A1 * | 2/2018 | Eash | G02B 27/283 |
| 2018/0045984 A1 * | 2/2018 | Evans | G02F 1/0136 |
| 2018/0149862 A1 * | 5/2018 | Kessler | G02B 27/0172 |

FOREIGN PATENT DOCUMENTS

| | | | |
|---|---|---|---|
| WO | 2015190157 A1 | 12/2015 | |
| WO | 2016087393 A1 | 6/2016 | |

OTHER PUBLICATIONS

Lee, Yun-Han et al., Switchable Lens for 3D Display, Augmented Reality and Virtual Reality. Society for Information Display (SID), International Symposium Digest of Technical Papers, vol. 47, Issue 1, May 25, 2016 (4 page).

Matjasec et al., "All-Optical Thermos-Optical Path Length Modulation based on the Vanadium-Doped Fibers," Optical Society of America, vol. 21, No. 10, May 2013, pp. 1-14.

Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).

PCT Search Report PCT/US2017/046647, dated Nov. 6, 2017, 2 pages.

PCT Written opinion PCT/US2017/046647, dated Nov. 6, 2017, 7 pages.

Polatechno Co., Ltd., LCD Projector Components, http://www.polatechno.co.jp/english/products/projector.html downloaded Jun. 17, 2016 (2 pages).

Sandner et al., "Translatory MEMS Actuators for optical path length modulation in miniaturized Fourier-Transform infrared spectrometers," MEMS MOEMS 7(2), Apr.-Jun. 2008 pp. 1-11.

\* cited by examiner

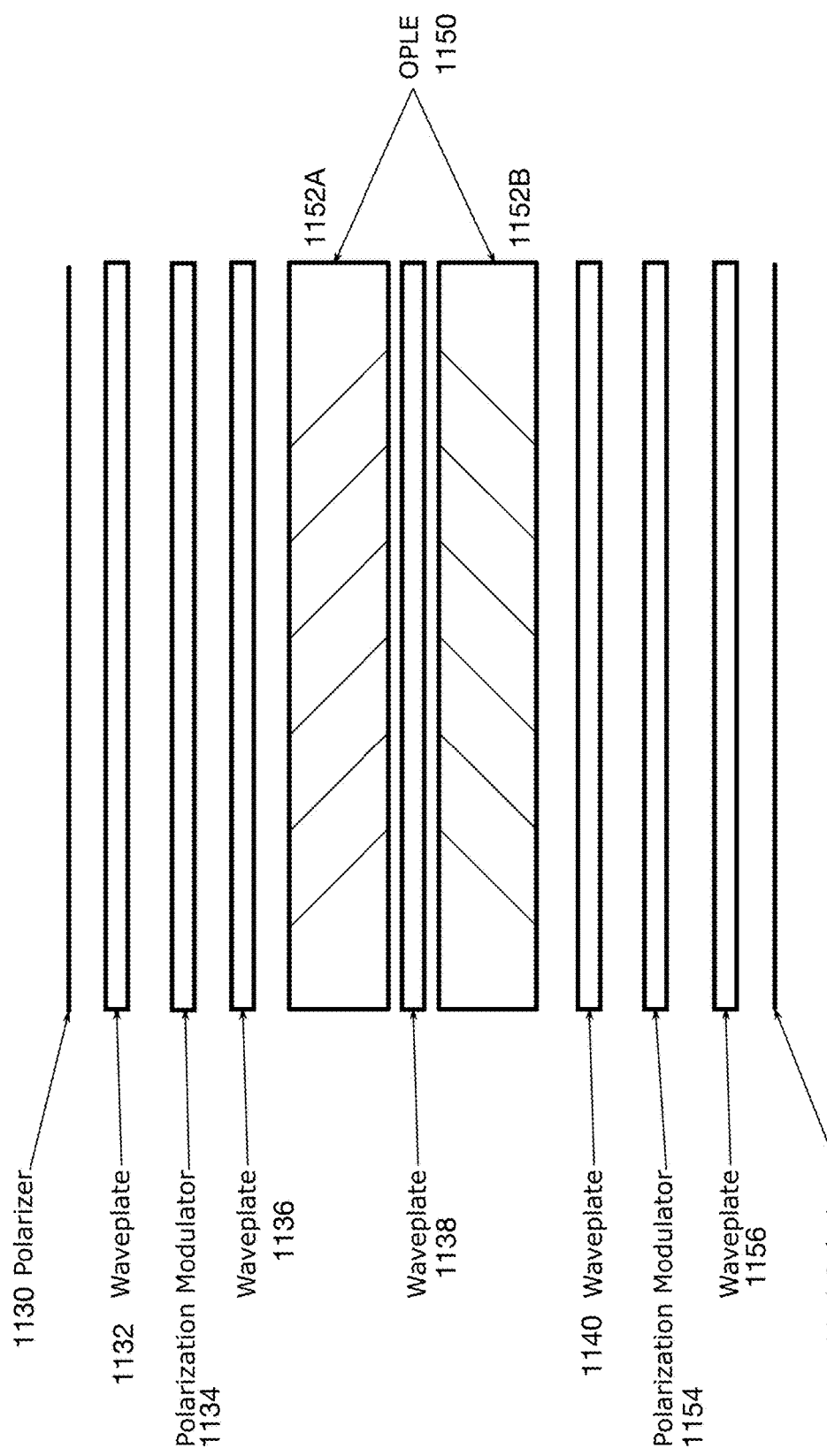

DIGITAL LIGHT PATH LENGTH MODULATION SYSTEMS

RELATED APPLICATIONS

The present invention claims priority to U.S. patent applications Ser. No. 15/335,298, filed on Oct. 26, 2016, (Our Ref. 14100P0031) which claims priority to U.S. patent application Ser. No. 15/236,101, filed on Aug. 12, 2016 (14100P0030). The present invention also claims priority to U.S. patent application Ser. No. 15/358,040 filed on Nov. 21, 2016 (14100P0036). All of the above applications are incorporated herein by reference.

FIELD

The present invention relates to digital light path length modulation systems.

BACKGROUND

Light path length modulation is useful in image capture as well as image display, to provide dimensionality. Prior art light path length modulators utilize a freeform surface prism.

BRIEF DESCRIPTION OF THE FIGURES

The present invention is illustrated by way of example, and not by way of limitation, in the figures of the accompanying drawings and in which like reference numerals refer to similar elements and in which:

FIG. 11B illustrates another embodiment of a modulation stack configuration.

DETAILED DESCRIPTION

A digital light path modulation system is described. The digital light path modulation system includes a polarization modulator, and an optical path length extender (OPLE), which provides two or more path lengths based on a polarization of the light. In some embodiments, the OPLE may have stripes on a surface of the OPLE, to block a portion of the light. In some embodiments, the stripes may be on one or more of the entry surface, the exit surface, or in the middle of a paired OPLE. In some embodiments, the digital light path modulation system may include an additional polarization modulator. In some embodiments, the digital light path modulation system may include two OPLEs and a birefringent waveplate between the two OPLEs. In some embodiments, the OPLE may have concentric polarization sensitive reflective elements to create the multiple path lengths. In one embodiment, the digital light path modulation system may have OPLEs which are unique in their configuration. Such OPLEs may be used as an optical key.

The following detailed description of embodiments of the invention makes reference to the accompanying drawings. The drawings show various embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is not to be taken in a limiting sense, and the scope of the present invention is defined only by the appended claims.

Figure 1:
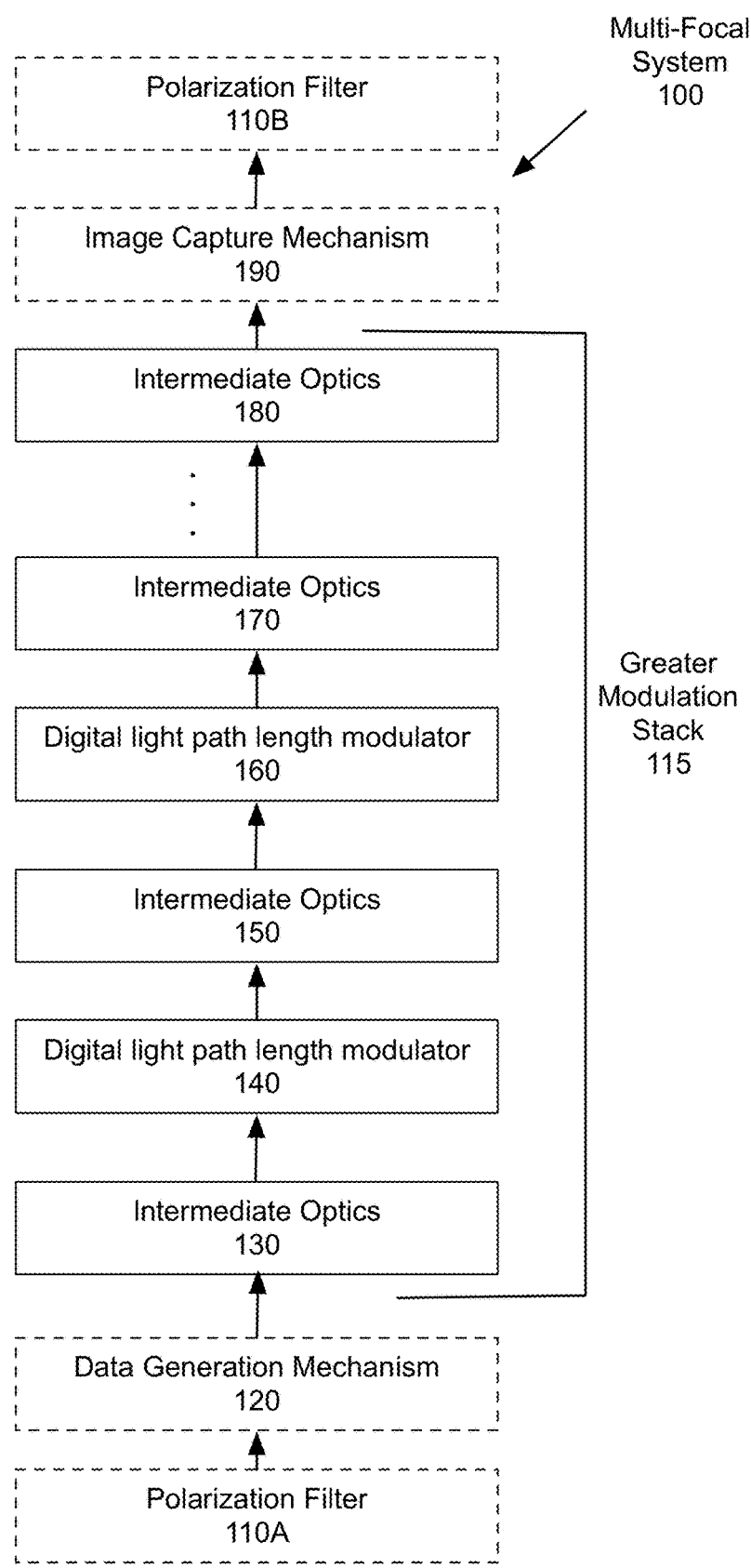
FIG. 1 is a block diagram of one embodiment of a multi-focal system including a modulation stack.

FIG. 1 is a block diagram of one embodiment of a multi-focal system 100. The multi-focal system 100, in one embodiment, includes a plurality of digital light path length modulators (140, 160) as well as one or more intermediate optics elements (130, 150, 170, 180) together forming a greater modulation stack 115. In one embodiment, the multi-focal system 100 in a real system may include 6-30 elements which include lenses, mirrors, apertures, and the like, referred to as intermediate optics. In one embodiment, the intermediate optics may be interspersed with the digital light path length modulators. In one embodiment, the intermediate optics may be positioned before and/or after the set of digital light path length modulators. In one embodiment, there may be a first polarization filter 110A before the modulation stack 115, and a second polarization filter 110B after the modulation stack 115. In another embodiment, only one of those polarization filters 110A, 110B may be present in the system.

The multi-focal system 100 is used to adjust the light path, creating a plurality of focal planes. This enables the use of multiple focal lengths in a single display. In one embodiment, this is done by providing time sequential slices of data, and adjusting the light path length using the digital light path length modulator. The multi-focal system 100 permits the use of a small and easily manufactured optical element, in combination with a polarization modulator, to provide this feature. This provides an organic vision system, for projection. It can also be used for image capture, and various other uses in which light waves or other waves in a similar spectrum are either projected or captured. In one embodiment, the intermediate optics of the multi-focal system 100 correct for chromatic aberration and other irregularities of optical systems.

Figures 2A, 2B:
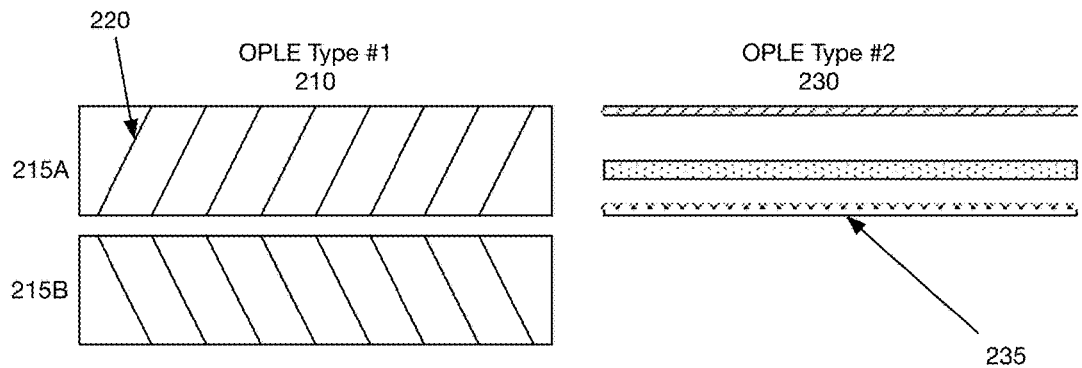
FIG. 2A and FIG. 2B illustrate two configurations of an optical path length extender (OPLE).

FIG. 2A and FIG. 2B illustrate two configurations of an optical path length extender (OPLE). FIG. 2A is a diagram of one embodiment of a first type of OPLE 210, referred to as a transverse OPLE. The OPLE 210 includes one or more plates 215A, 215B, each plate 215A, 215B having a plurality of polarization sensitive reflective elements 220, which reflect light having a first polarization, and pass through light with a second polarization. The reflected light bounces between the polarization sensitive reflective elements two or more times, before exiting the OPLE 210. This increases the path length of the light having the first polarization, compared to the light having the second polarization which passes directly through the transverse OPLE 210. Further details on the OPLE of FIG. 2A are discussed in co-pending U.S. patent application Ser. No. 15/236,101, filed on Aug. 12, 2016, which is incorporated herein in its entirety.

FIG. 2B is a diagram of one embodiment of a second type of OPLE, referred to as a longitudinal OPLE 230. The OPLE includes a reflective element 235 on the bottom surface, which reflects light having a first polarization. The light in turn bounces back from the top of the OPLE 230, before exiting the OPLE through the bottom surface. This increases the path length of the light having the first polarization, compared to the light having the second polarization which passes directly through the longitudinal OPLE. Further details on the OPLE 230 of FIG. 2B are discussed in co-pending U.S. patent application Ser. No. 15/358,040, filed on Nov. 21, 2016, which is incorporated herein in its entirety.

Figure 2C:
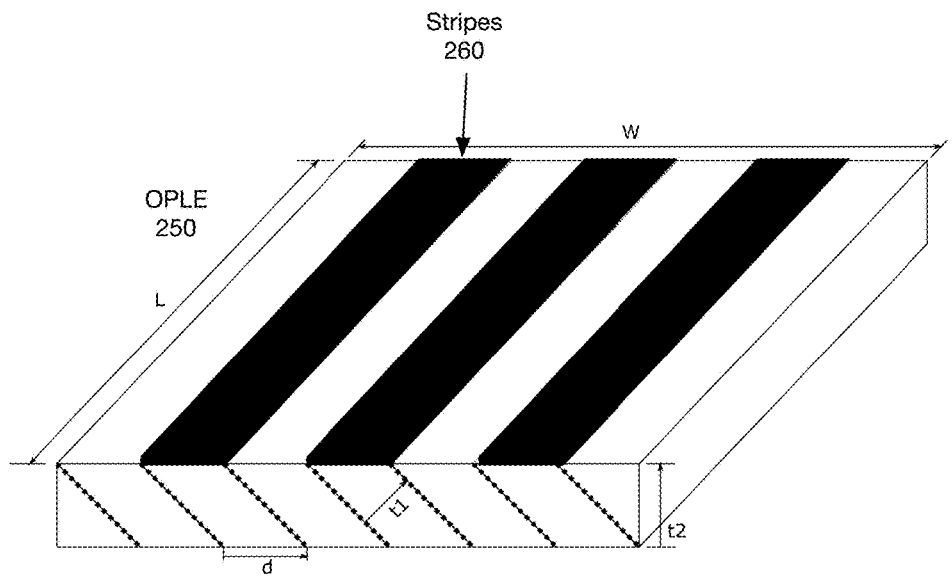
FIG. 2C is a diagram of one embodiment of a striped OPLE.

FIG. 2C is a diagram of one embodiment of a striped OPLE. Striped OPLE 250 is a transverse OPLE in which alternating stripes on the entry face of the OPLE are blocked out. These stripes 260 may be metal, thin film black carbon, a polarizer filter, or another material which blocks passage of light through the stripe 260. In one embodiment, the striping is uniform. In another embodiment, the stripes may not be uniform. For non-uniform stripes, the stripes may not be the same spacing or thickness between lines.

For the striped OPLE 250, the different polarizations of light exit in alternate stripes. The exit stripes are defined by the stripes on the face of the OPLE. In one embodiment, an OPLE 250 may include 3 to 30 defined stripes. The transverse OPLE 250 laterally shifts the light with a first polarization, by bouncing the light through the polarization sensitive reflective elements. Thus, the light with the first polarization is shifted. The light with the second polarization passes through, exiting the OPLE 250 in the areas corresponding to non-striped entry surface areas, while the light with the first polarization exits in areas corresponding to striped areas. In one embodiment, for a striped OPLE 250, post-processing assembles the final image from the alternating stripes of image portions in the different stripes.

Figure 3A:
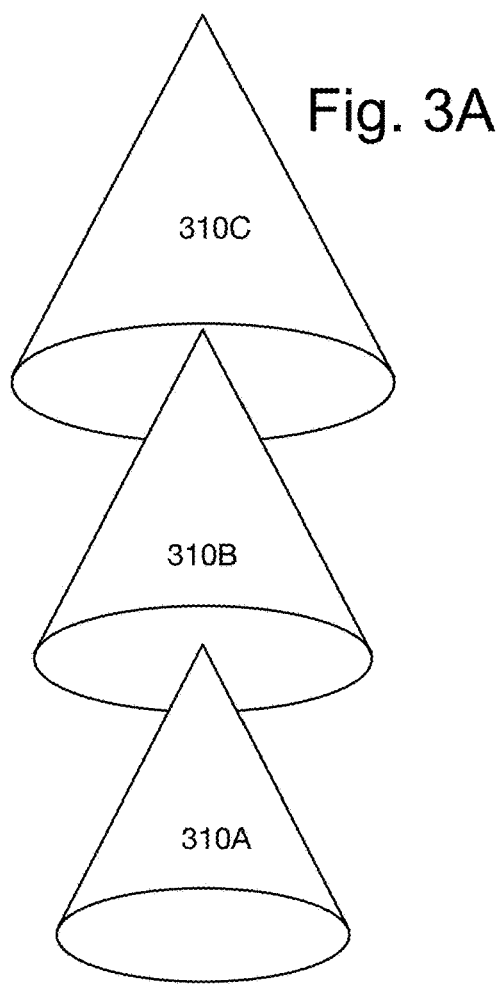
FIGS. 3A and 3B illustrate one embodiment of building a circular OPLE.
Figure 3B:
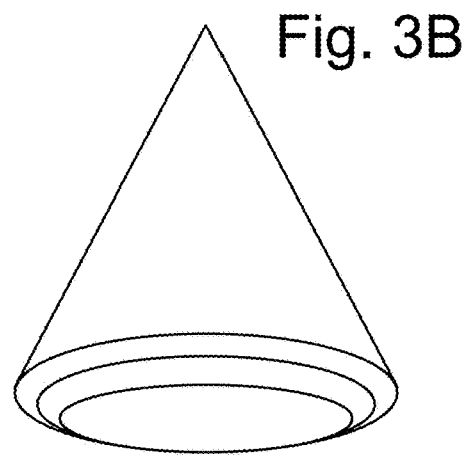
Figure 3C:
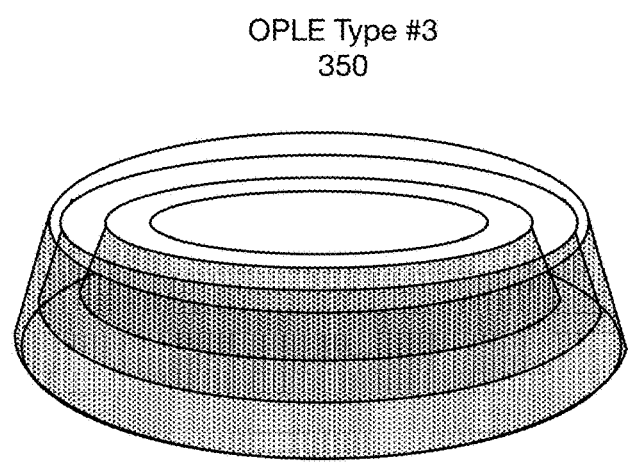
FIG. 3C illustrates one embodiment of a circular OPLE.

FIGS. 3A and 3B illustrate one embodiment of building a circular OPLE. FIG. 3A illustrates hollow cones which are assembled, as shown in FIG. 3B. In one embodiment, each cone 310A-310C is of uniform thickness, made of optically clear material, and has its exterior covered with a polarization sensitive reflective material. In another embodiment, the interior of the cone may be covered by the reflective material. The cones 310A-310C are stacked. In one embodiment, the cones are fabricated by stacking many cones, in one embodiment over 100, and cutting round conic sections. In one embodiment, the conic sections have between 3 and 30 concentric rings. In one embodiment, the thickness of the cone may range from 0.1 mm to 2 mm. In one embodiment, the angle of the cone may be between 30 and 60 degrees. In one embodiment, the cones 310A-C are attached to each other, using optically clear glue. In one embodiment, three to ten cones are stacked. They are then cut, to make concentric OPLEs 350, shown in FIG. 3C. As can be seen, light entering the concentric OPLE 350 with a first polarization would be reflected by the conical cross-sections of polarization sensitive reflective elements, while light with a second polarization would pass through, thereby creating two focal lengths, based on light polarization. In one embodiment, blackout lines may be applied to the concentric rings on the top or bottom of the circular OPLE, overlapping the seams. The use of blackout lines is described in more detail below with respect to FIGS. 10A-10G.

Figure 4:
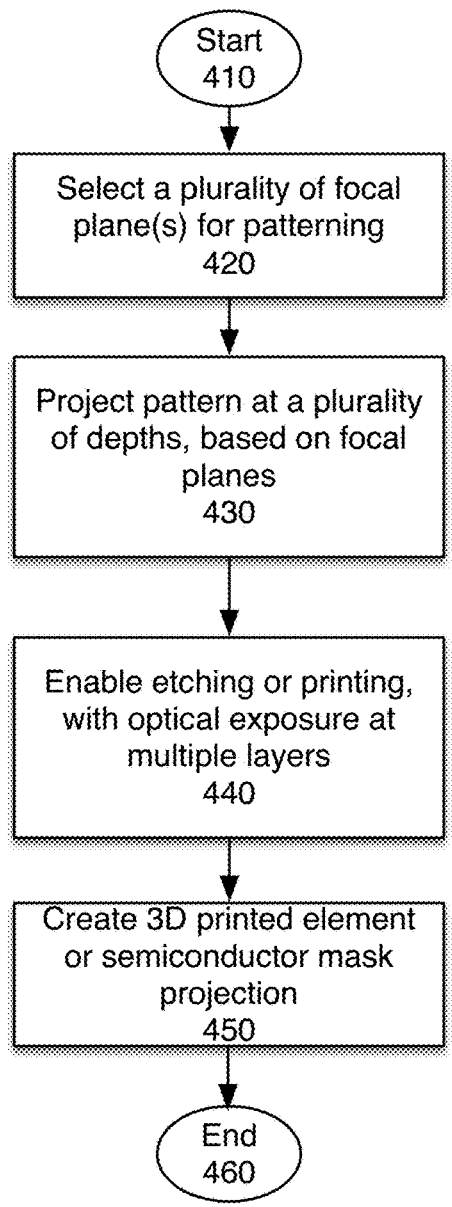
FIG. 4 is a flowchart of one embodiment of using multi-focal length projection for patterning and three-dimensional printing.

FIG. 4 is a flowchart of one embodiment of using multi-focal length projection for patterning and three-dimensional printing. Patterning is used to lay down a pattern for etching, for example on semiconductors or similar materials. In semiconductor processing, patterning uses the process of photolithography and optical masks to print patterns that guide the deposition or removal of material from the wafer at specific steps in the device fabrication process. Three dimensional printing often utilizes light to convert powder or another material to solid. The process, in one embodiment uses a multi-focal system, such as the one described with respect to FIG. 1 above. In one embodiment, this may be particularly useful for processes that use an optically transmissive liquid base that is solidified through exposure to light. It may also be useful with thermally activated processes, in which the light is used to heat elements. By shifting the focus, or providing multiple focal distances, the system may be used to heat elements over, under, or on the surface of thermally bonded polymer. The process starts at block 410.

At block 420, a plurality of focal planes are selected for patterning. The plurality of focal planes are selected by selecting the polarization of light, through a plurality of OPLEs. With multiple OPLEs, and by varying the polarization of the light, a plurality of focal planes may be selected.

At block 430, a pattern is projected at a plurality of depths. The "depths" are defined by the selected focal planes.

At block 440, etching or printing can take advantage of the optical exposure at multiple depths. In one embodiment, the system may further utilize a polarization-sensitive material for patterning. This may enable more complex etching.

At block 450, the three dimensional printed element or semiconductor mask projection is created, using the multiple depths. In one embodiment, the etching or printing may utilize a conventional semiconductor mask or polymer or material printing techniques. However, utilizing the multi-focal light, the system can create more complex images. For example, for semiconductors, patterning at small sizes generally requires multiple iterations to create shape precision. However, using multiple focal lengths, the system can simultaneously create the multi-patterning needed for small pitch elements. In one embodiment, by providing a specific mask set, distance, and focal shape, angular trenches may be created by exposing with light that hits at an angle instead of directly. In one embodiment, an OPLE may be used before a contact mask plate to allow for different exposure patterns from the mask.

In this way, utilizing multiple focal depths can be used to improve printing, patterning, or etching, using light.

Figure 5:
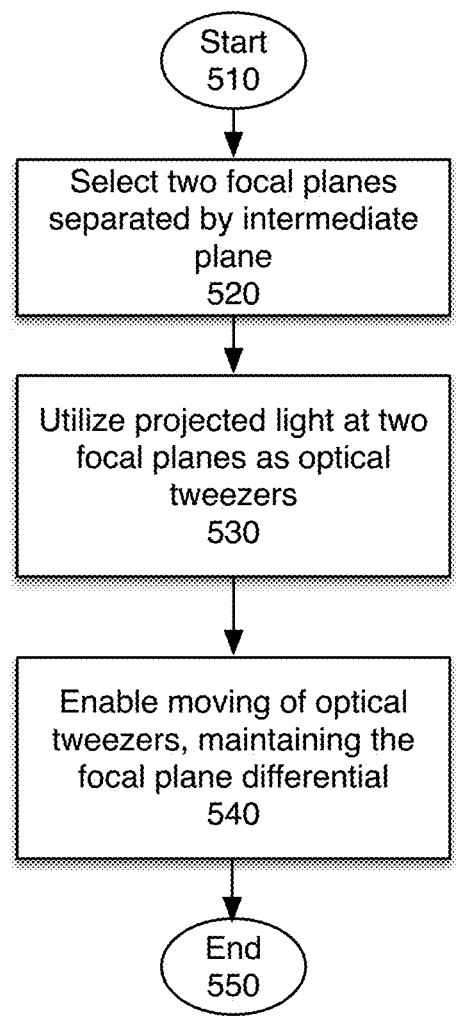
FIG. 5 is a flowchart of one embodiment of utilizing multi-focal light for optical tweezers.

FIG. 5 is a flowchart of one embodiment of utilizing multi-focal light for optical tweezers. Typical optical tweezers are scientific instruments that use highly focused laser beams to physically hold and move microscopic dielectric objects.

At block 520 two focal planes are selected. The two focal planes are in close proximity. The distance between the two focal planes is defined as the intermediate plane.

At block 530, projected light at the two focal planes is used as optical tweezers. In one embodiment, the light is coherent light.

At block 540, the process enables moving of the optical tweezers, maintaining the focal plane differential. This enables moving of an object captured between the two focal planes. The process then ends, at block 550.

Figure 6A:
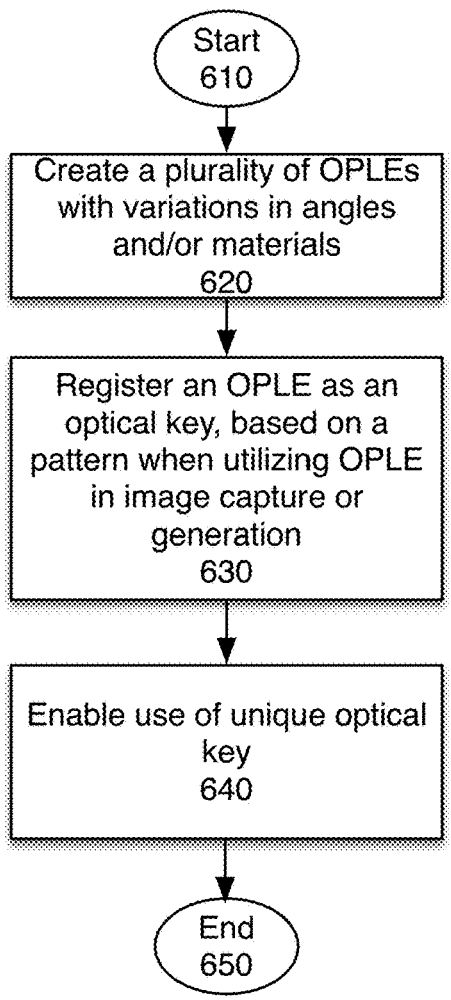
FIG. 6A is a flowchart of one embodiment of using variably manufactured OPLEs for generating a unique optical key.

FIG. 6A is a flowchart of one embodiment of using variably manufactured OPLEs for generating a unique optical key. An OPLE, as noted above, alters the path of the light, and the focal distance of the light, based on the thickness of the plate, the angle of the polarization sensitive reflective elements, any curvature of the OPLE, etc. For most uses, the design is intended to provide consistent OPLE configurations, which are substantially identical in function. However, in one embodiment, variably manufactured OPLEs may be used as unique optical keys.

Figure 6B:
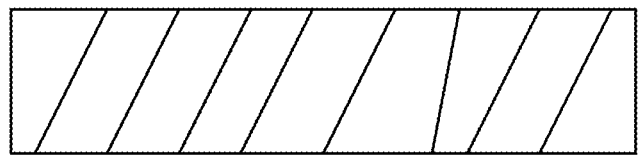
FIGS. 6B-6E illustrate embodiments of variations which may be used in the OPLEs of FIG. 6A.
Figure 6C:
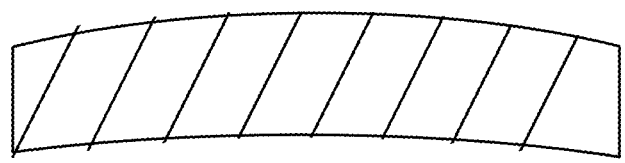
Figure 6D:
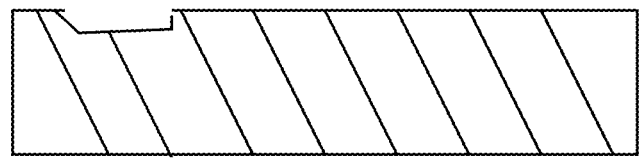
Figure 6E:
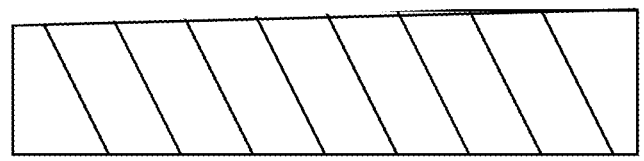

The process starts at block 610. At block 620, a plurality of OPLEs are created with variations. FIGS. 6B-6D illustrate embodiments of variations which may be used in the OPLEs of FIG. 6A. For example, the variation may be the angles of the polarization sensitive reflective elements, as shown in FIG. 6B. One or all of the angles may be changed. The curvature of the OPLE itself, as shown in FIG. 6C may alter the functioning of the OPLE, and thus function as a way to create variation. FIG. 6D illustrates an unevenness in the entry or exit surface of the OPLE, which may be used as a variation. FIG. 6E illustrates an angle difference in the top or bottom surface of the OPLE, which may be used as a variation.

Returning to FIG. 6A, a unique OPLE may be registered as an optical key, based on a pattern when utilizing the OPLE in image capture or image generation. In one embodiment, the key may be registered against a specific illumination pattern. The illumination pattern for example may be a set of angles or images. In one embodiment, the illumination pattern may also be unique to the individual being authenticated. In one embodiment, the illumination pattern may utilize the user's fingerprint or other biometric.

In one embodiment, the registering may test OPLEs, and if the variation is insufficiently detectable, may reject the OPLE as a unique key. In another embodiment, the system may test OPLEs for normal use, and select those which fail to meet the required consistency of function as optical keys. In this way, OPLEs which otherwise would be rejected for variations provide an additional feature. In one embodiment, registration comprises testing the OPLE and recording the pattern generated, or its variation from the normal pattern.

At block 640, use of the unique optical key is enabled. The unique optical key may be used to unlock secured content or sites, or in any other context where being able to provide a unique key would be useful. In one embodiment, the unique OPLE key may be combined with other security features, for example fingerprints. Reading the fingerprint through the unique OPLE provides two-factor authentication requiring something the user is (biometric) with something the user has (optical key OPLE). The process then ends.

Figure 7A:
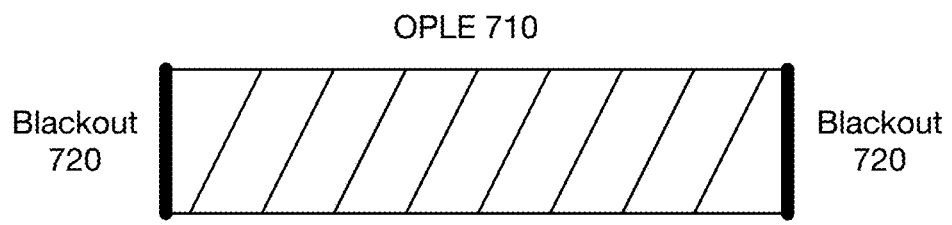
FIGS. 7A-7C illustrate embodiments of an OPLE with edge blackout.
Figure 7B:
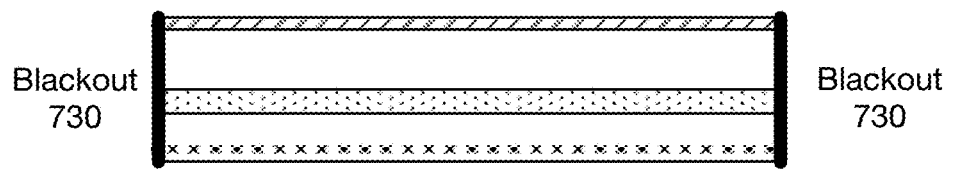
Figure 7C:
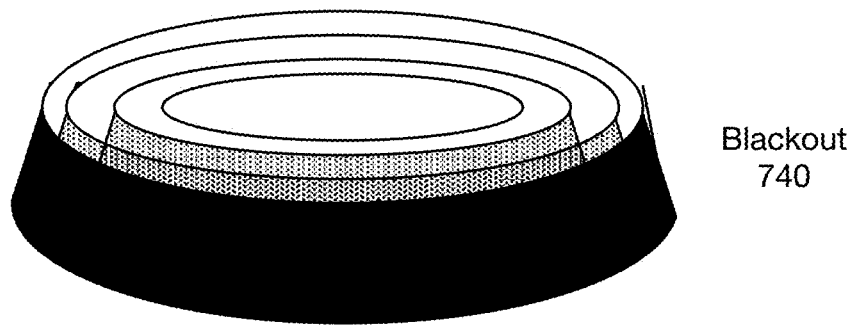

FIG. 7A illustrates one embodiment of an OPLE with edge blackout. In one embodiment, the edges 720 of the OPLE 710 are blacked out. This keeps any light impacting the edge of the OPLE from exiting or being reflected. In one embodiment, the edge blackout is metal, thin film black carbon, a polarization filter, or another material which blocks passage of light through the side of the OPLE. FIG. 7B illustrates one embodiment of a longitudinal OPLE 730 with edge blackout 740. FIG. 7C illustrates a circular OPLE 750 with edge blackout 760. The edge of a circular OPLE extends around the circumference, in one embodiment.

Figure 8A:
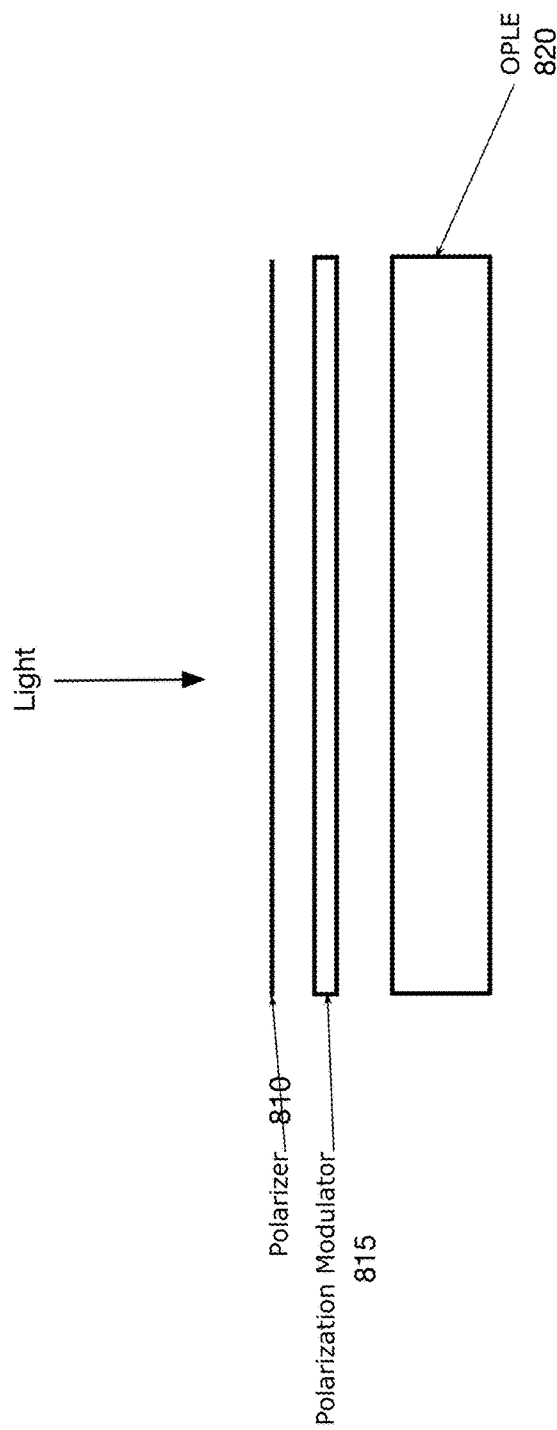
FIG. 8A illustrates one embodiment of a basic modulation stack.

FIG. 8A illustrates one embodiment of a basic modulation stack. The standard configuration, shown in FIG. 8A includes a polarizer 810 and a polarization modulator 815, through which light passes before impacting the OPLE 820. The polarizer polarizes the light and polarization modulator 815 selectively rotates the polarization. In one embodiment, if the light is already polarized, polarizer 810 may be removed.

Figure 8B:
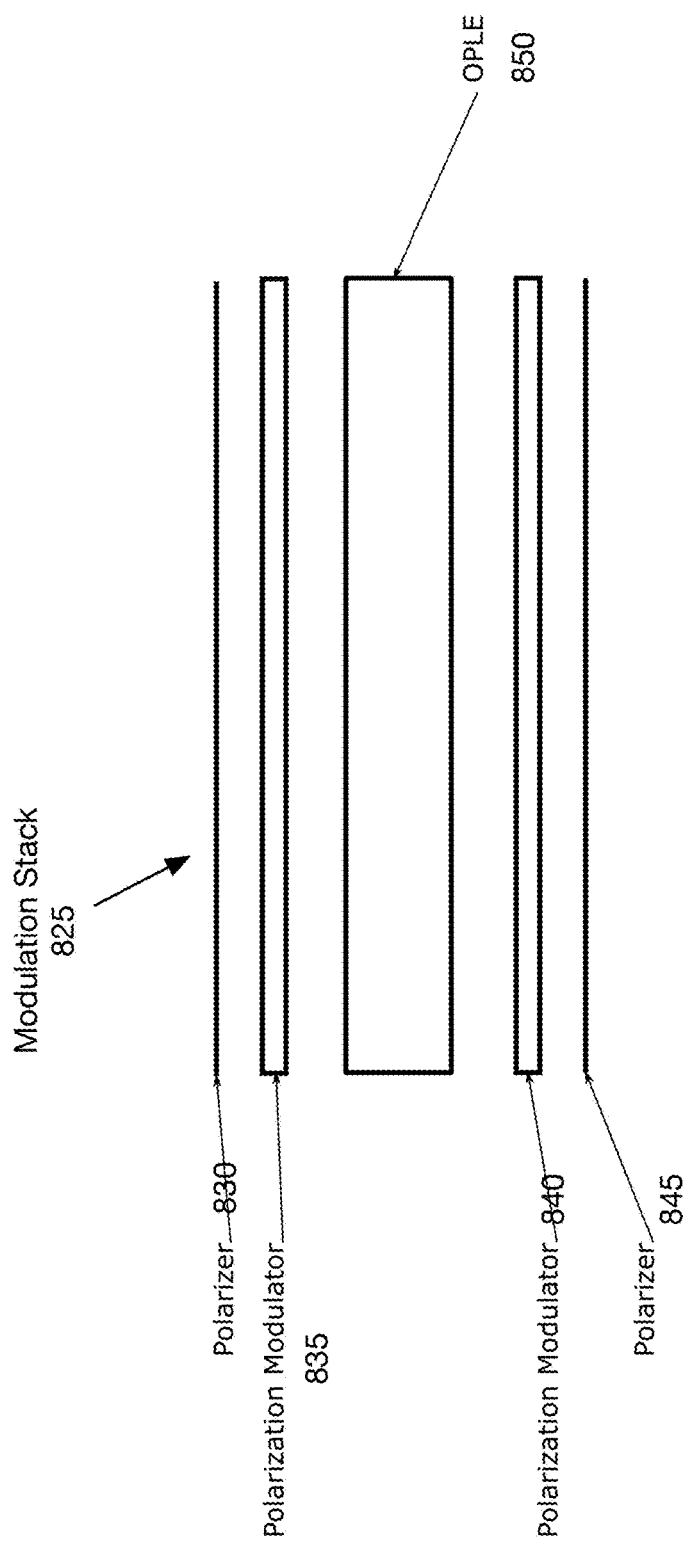
FIG. 8B illustrates one embodiment of a multiple-modulator modulation stack.

FIG. 8B illustrates one embodiment of a multiple-modulator modulation stack. In addition to the polarizer 830 and polarization modulator 835 above OPLE 850, this configuration includes a polarization modulator 840 and polarizer 845 below the OPLE 850. Because the polarization modulator 835 is not 100% efficient, the output of OPLE 850 includes lights with both types of polarization. The output of OPLE 850 is passed through a second polarization modulator 840 and polarizer 845, to remove the subset of light with the polarization that was not selected.

Figure 8C:
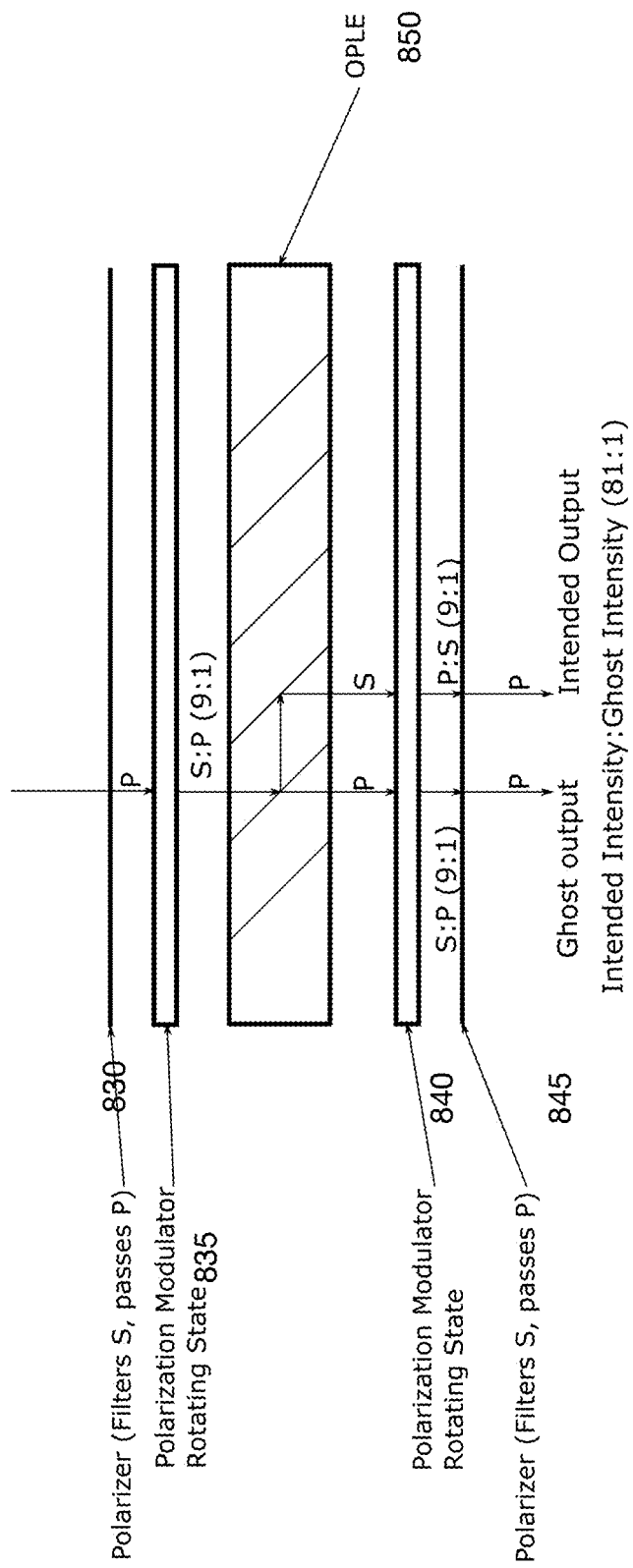
FIG. 8C illustrates the multiple-modulator modulation stack with the first polarization rotator in a rotating state.

FIG. 8C illustrates the multiple-modulator modulation stack with the first polarization modulator 835 in a rotating state. The first polarizer 830 filters S-polarized light, and passes P-polarized light. The P-polarized light from polarizer 830 is rotated by polarization modulator 835. However, not 100% of the light is rotated, since polarization modulator 835 is imperfect. In one embodiment, the polarization modulator 835 rotates 90% of the light, leaving 10% as P-polarized light. The OPLE 850 passes through the P-polarized light, and reflects the S-polarized light before passing it through, as described above.

The second polarization modulator 840 in the rotating state again rotates the light, with 90% of the light being rotated. The ghost output is thus reduced by a square of the imperfect rotation, e.g. it is 1/81 as bright as the intended output. This reduces the ghost output. The provided rotation ratio of 1:9 is merely exemplary, and the polarization modulator may be more or less efficient in rotating light.

Figure 8D:
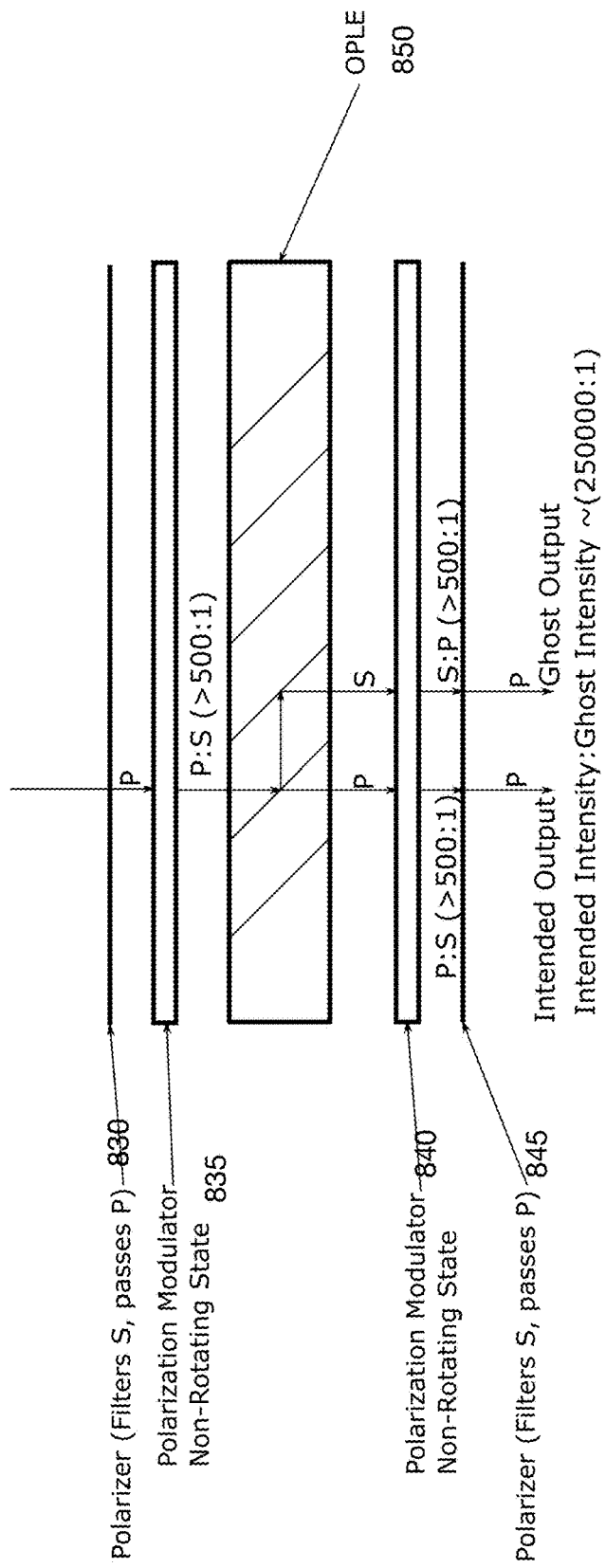
FIG. 8D illustrates the multiple-modulator modulation stack with the first polarization rotator in a non-rotating state.

FIG. 8D illustrates the multiple-rotator modulation stack with the first polarization modulator in a non-rotating state. In this instance, the erroneous rotation is 1:500, or less. As in FIG. 8C, the second polarization modulator also is in a non-rotating state, and thus has an error of 1:500. Thus, the ghost output is reduced by a square of the imperfect rotation, e.g. it is 1/250,000 as bright as the intended output. Reducing the brightness of the ghost output improves the quality of the output, at the cost of reducing the overall brightness of the output.

Figure 9A:
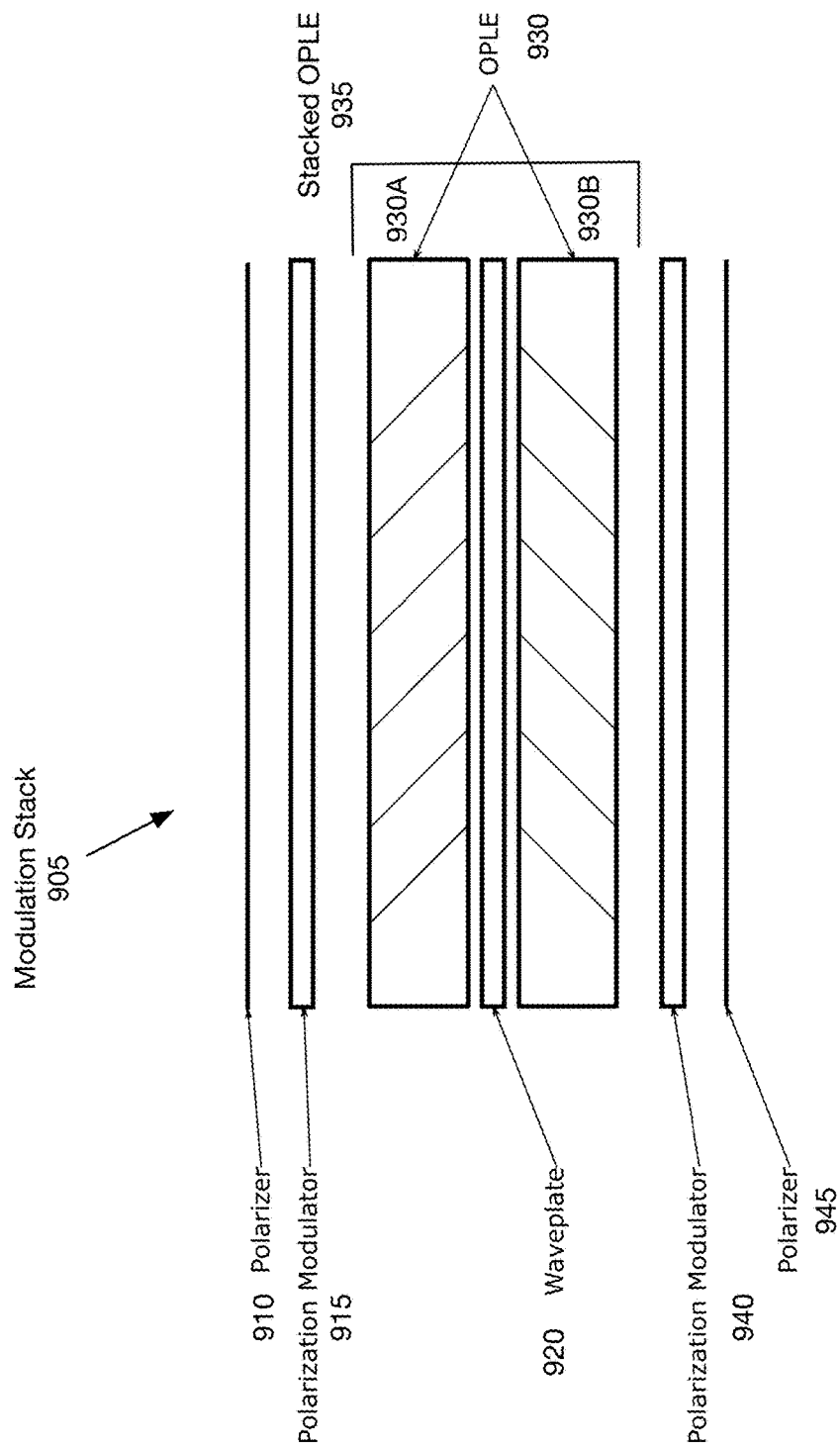
FIG. 9A illustrates one embodiment of a modulation stack with an intermediate waveplate.

FIG. 9A illustrates one embodiment of a modulation stack with an intermediate waveplate and two polarization modulators. By using an intermediate waveplate 920, the system can create three focal planes utilizing a single OPLE.

The polarizer 910 and polarization modulator 915 pass through light of a particular polarization. The OPLE 930 includes two plates 930A, 930B, and a waveplate 920 positioned between the two plates. In one embodiment, the waveplate is a quarter waveplate. However, the waveplate may be any birefringent waveplate. The polarization sensitive reflective elements of the two plates 930A, 930B, are matched, in one embodiment. In this example the two plates 930A, 930B make up a self-aligning OPLE 930. However in another embodiment, the two plates 930A, 930B need not be self-aligning. This type of OPLE 930, with an interposed waveplate 920, may be referred to as a stacked OPLE 935.

In one embodiment, another polarization modulator 940 and polarizer 945 is positioned after the OPLE 930. Although this illustration shows the elements separately, in one embodiment the plates 930A, 930B, and waveplate 920 may be bonded together, rather than spaced apart. This type of stacked OPLE 935 enables the creation of three focal planes with a single OPLE.

Figure 9B:
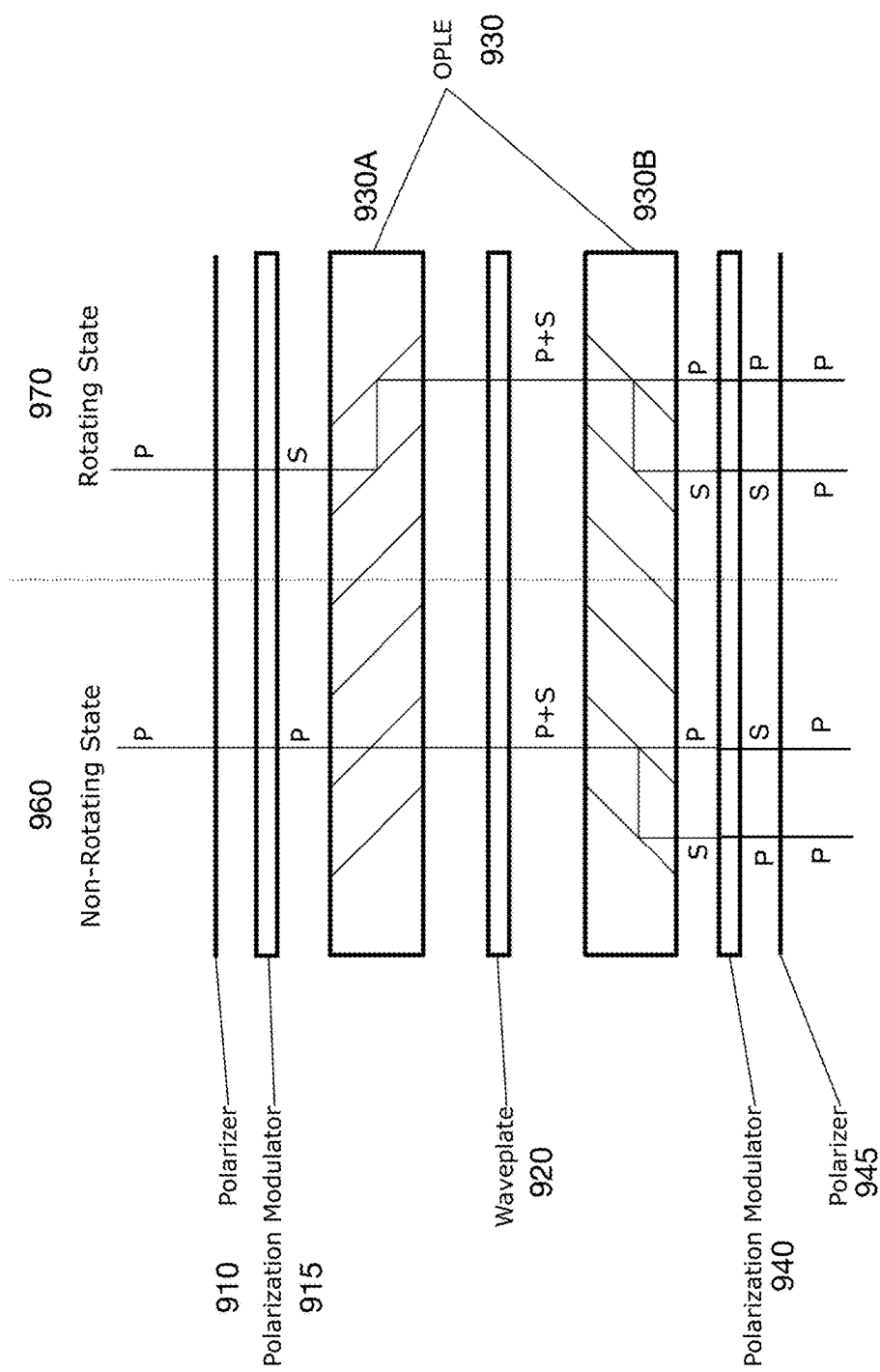
FIG. 9B illustrates the light passing through the modulation stack of FIG. 9A.

FIG. 9B illustrates the light passing through the modulation stack of FIG. 9A, showing the polarization modulator in both the rotating state 970 and non-rotating state 960. In the non-rotating state 960, the P-polarized light passes through the first plate 930A of the OPLE, and is split to P and S polarized light by the waveplate 920. The P-polarized subsection of the light passes through the second plate 930B, while the S-polarized light takes the longer path through the second plate 930B. Because the waveplate 920 splits the single polarized light into two polarizations, the output of the second plate 930B is both P-polarized light and S-polarized light, each with a different focal length. Thus the focal lengths are:

First Plate P, second plate P (non-rotating)
First Plate P, second plate S (non-rotating)
First plate S, second plate S (rotating)
First plate S, second plate P (rotating)

Because the first and second plates are matched, the P-S focal distance is the same as the S-P focal distance, and thus, the system creates three different focal planes, with the OPLE 930 including waveplate 920.

Figure 10C:
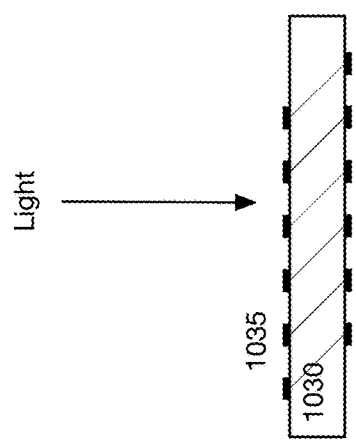
FIGS. 10A-10C illustrate embodiments of an OPLE including blackout lines.
Figure 10B:
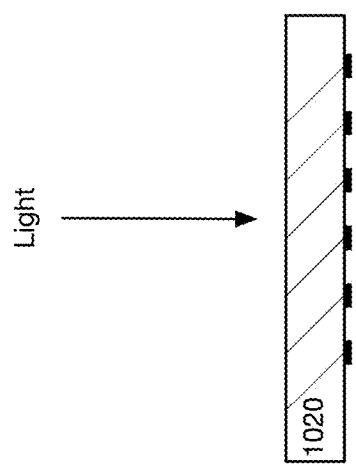
Figure 10A:
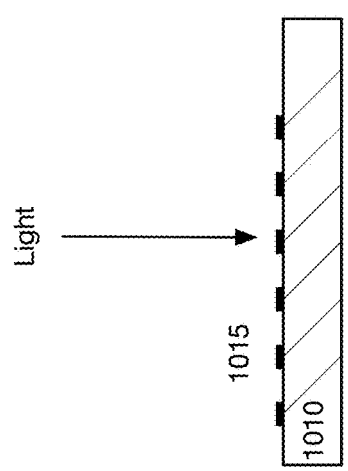
Figure 10D:
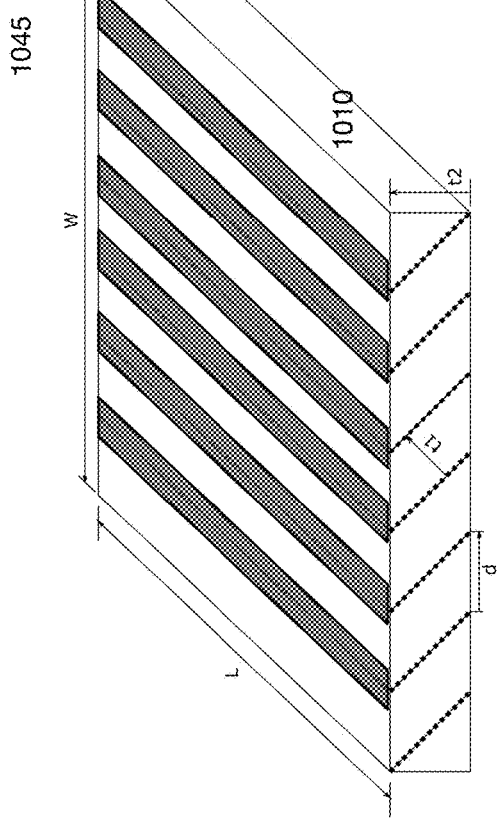
FIG. 10D is a perspective view of the OPLE of FIG. 10A.

FIGS. 10A-10C illustrate embodiments of an OPLE including blackout lines. The blackout lines are along the lines formed by the polarization sensitive reflective elements 1045 on a surface of the OPLE 1010, as can be seen in FIG. 10D. The blackout lines may be on the entry surface, shown in OPLE 1010, exit surface, shown in OPLE 1020, or both the entry and exit surfaces, as shown in OPLE 1030. The blackout lines may be metal, thin film black carbon, a polarizer filter, or another material which blocks passage of light through the blackout line. In one embodiment, the material is 100 micron stainless steel. In one embodiment, the material is as thin as possible, in one embodiment 1000 angstroms thick. The blackout lines block a portion of the light from traveling through the OPLE. This reduces the amount of light that travels through the OPLE 1010, 1020, 1030 and reduces ghost images. The blackout lines may absorb or reflect the light.

Figure 10F:
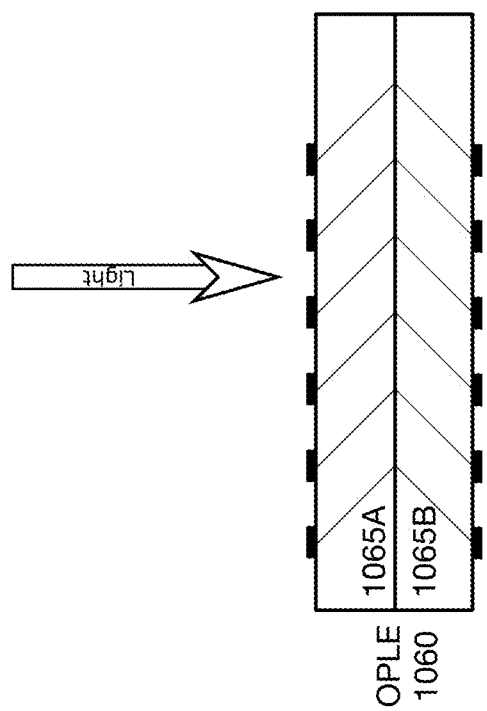
FIGS. 10E-10F illustrate embodiments of a paired OPLE including blackout lines.
Figure 10E:
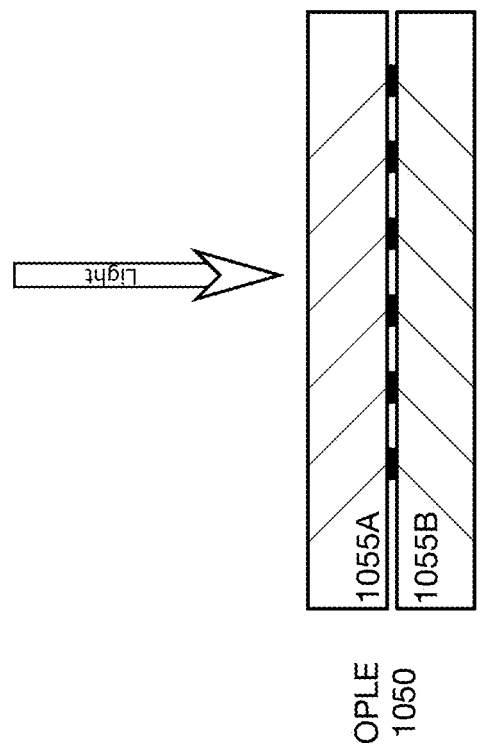

FIGS. 10E-10F illustrate embodiments of a paired OPLE including blackout lines. Each paired OPLE 1050, 1060 consists of two plates (1055A & 1055B, and 1065A & 1065B, respectively). The blackout lines may be positioned in the center (e.g. exit surface of a first plate 1055A, and entry surface of the second plate 1055B). The blackout lines may alternatively be positioned at the entry surface of the first plate 1065A, and the exit surface of the second plate 1065B.

Figure 10G:
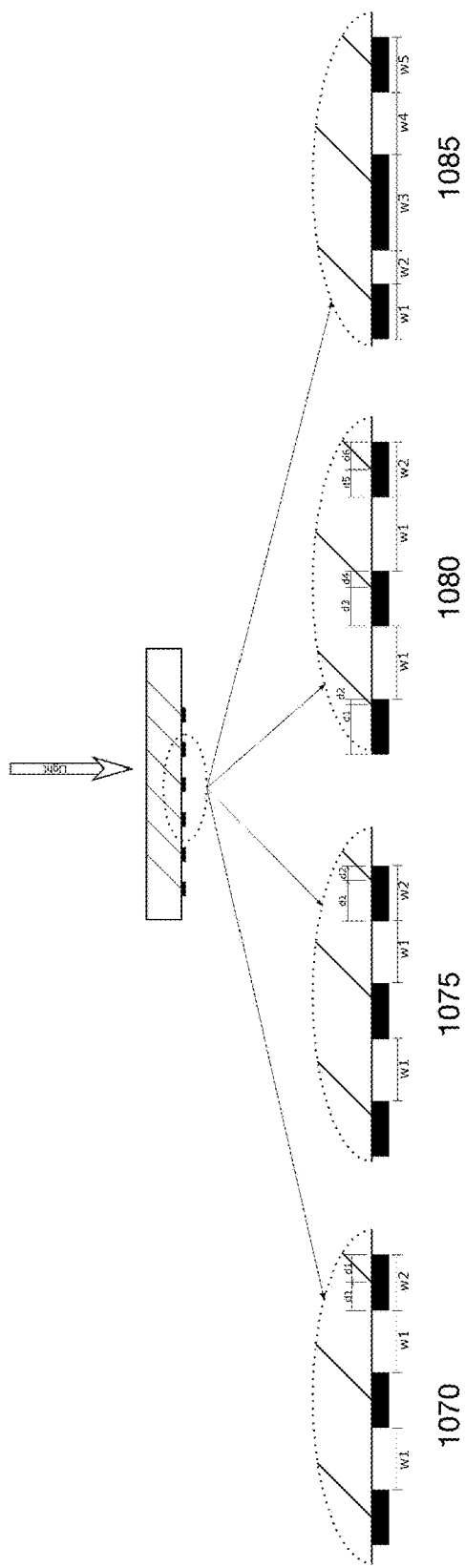
FIG. 10G illustrates some of the configurations of the blackout lines which may be used in the OPLEs of FIGS. 10A-10E.

FIG. 10G illustrates some of the configurations of the blackout lines which may be used in the OPLEs of FIGS. 10A-10F. The blackout lines may be evenly positioned, centered about the line formed by the polarization sensitive reflective element, and symmetric, as shown in 1070. The blackout lines may be off center from the line formed by the polarization sensitive reflective element, as shown in 1075. The blackout lines may be uneven in terms of their spacing, and may be different sizes, as shown in 1080 and 1085.

The blackout lines, in one embodiment, cover between 20% and 70% of the surface area of the OPLE. In one embodiment, the blackout lines are 0.3 to 0.6 mm wide, and 1000 angstroms thick. Though they are illustrated as large rectangles, the blackout lines are as thin as possible, in one embodiment. The purpose of these lines is to crop out the unwanted paths, in which light bounces too many times.

In one embodiment, the positioning of the blackout lines may be based on the optics of the system. In one embodiment, based on the angles of incident light, the blackout lines are positioned to maximize blocking of the light which is entering the system at the wrong angle.

In one embodiment, the blackout lines may be made of a polarizing material, blocking only one polarization of light. This reduces the light loss. In one embodiment, a plastic thin film may be used as a polarizing material that absorbs the light, rather than reflecting it. In one embodiment, in a modulation stack including multiple OPLEs, each of the OPLEs have blackout lines. In one embodiment, in a modulation stack including multiple OPLEs each of the OPLEs have blackout lines positioned on the same surface of the OPLE (top, bottom, both, or center for a paired OPLE).

Figure 11A:
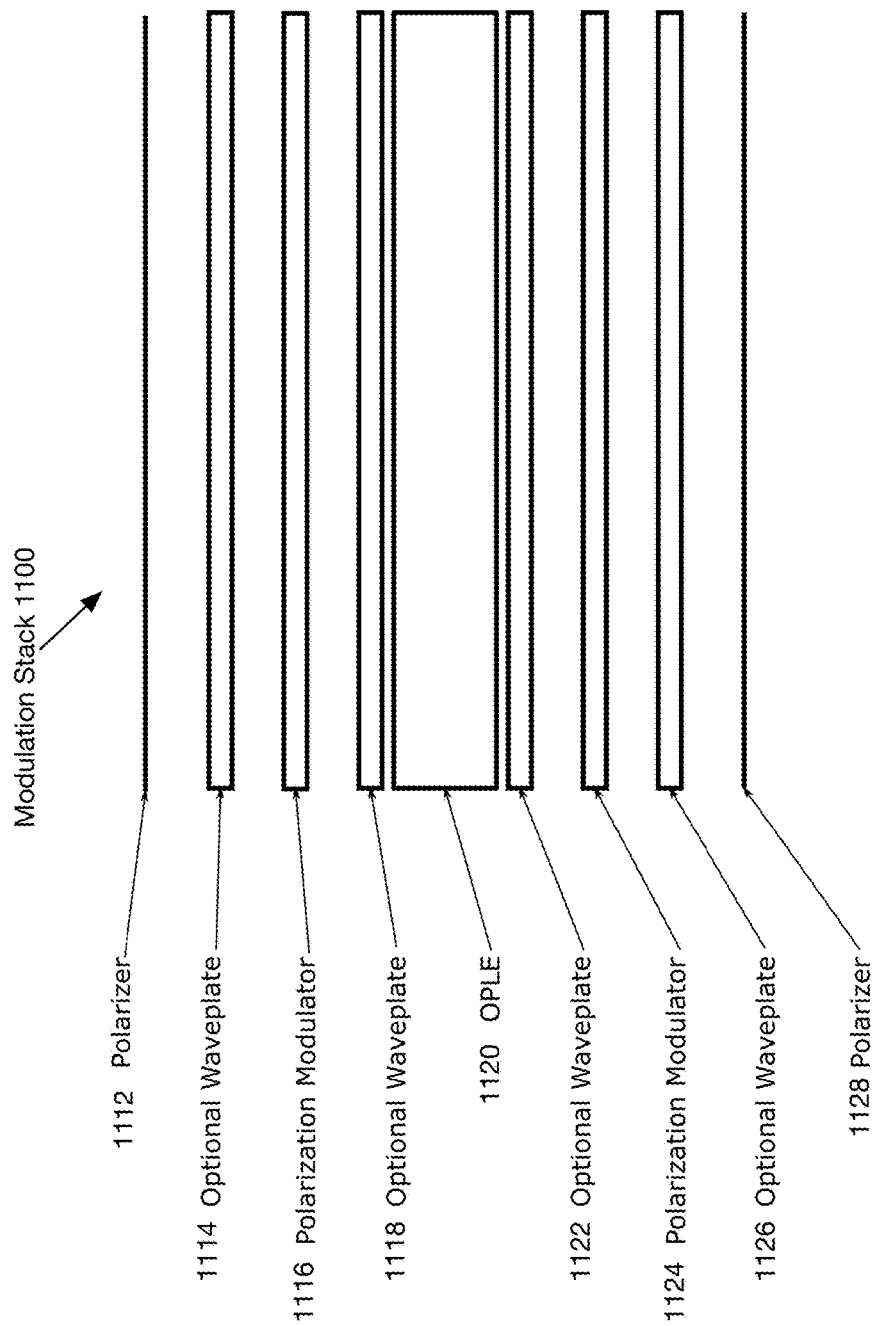
FIG. 11A illustrates one embodiment of a modulation stack configuration.

FIG. 11A illustrates one embodiment of a modulation stack configuration. The modulation stack 1100 includes a polarizer 1112 and polarization modulator 1116 before OPLE 1120, and a polarization modulator 1124 and polarizer 1128 after the OPLE 1120. Additionally, the modulation stack 1100 includes one or more waveplates 1114, 1118, 1122, 1126. The waveplates 1114, 1118, 1122, 1126 may be of a birefringent material be used to correct non-idealities, such as wavelength dependence of retardation, in the polarization modulator. In one embodiment, the waveplates may address a particular color or frequency range. In one embodiment, each of the waveplates 1114, 1118, 1122, 1126 may be tuned to a different frequency.

FIG. 11B illustrates another embodiment of a modulation stack configuration. Compared to the modulation stack of FIG. 11A, this modulation stack includes a waveplate 1138 between the plates 1152A, 1152B of OPLE 1150, forming a stacked OPLE that includes further waveplates 1132, 1136, 1138, 1140, and 1156. In one embodiment, in addition to wavelength correction provided by waveplates 1132, 1136, 1140, and 1156, this configuration also provides an additional focal depth, as discussed above with respect to FIG. 9B.

Figure 11C:
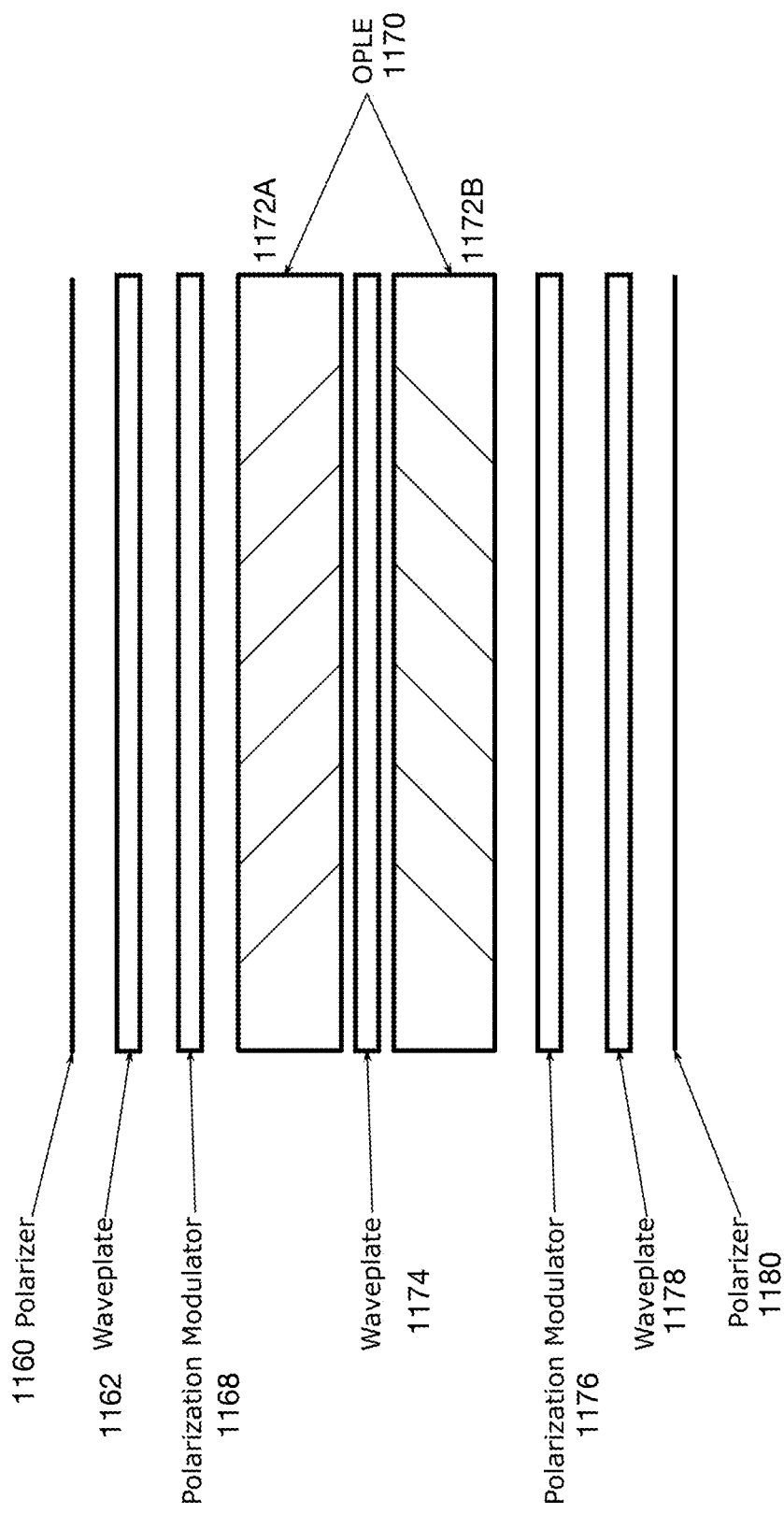
FIG. 11C illustrates another embodiment of a modulation stack configuration.

FIG. 11C illustrates another embodiment of a modulation stack configuration. This configuration includes three waveplates 1162, 1174, 1178, including one waveplate 1174 between the plates 1172A, 1172B of OPLE 1170. This is a simplified version of the modulation stack of FIG. 11B, providing three focal planes.

Figure 12:
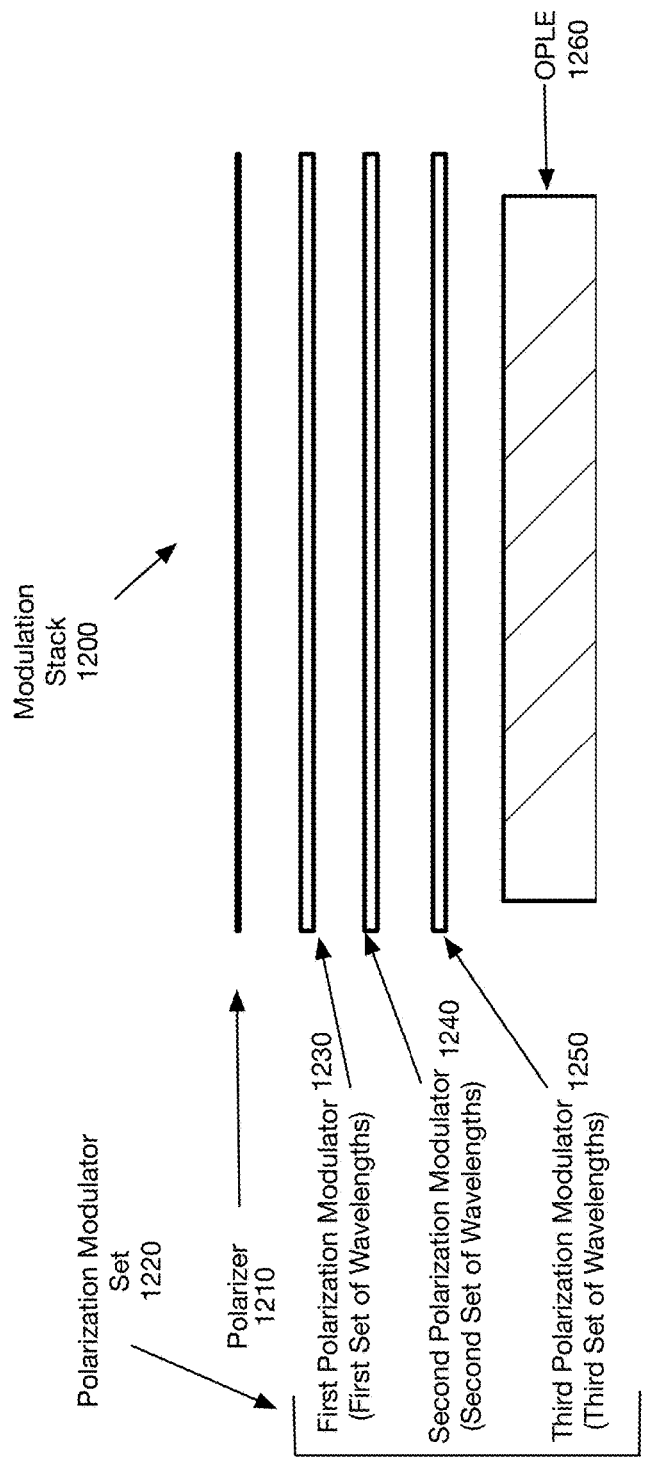
FIG. 12 illustrates one embodiment of modulation stack including a polarization modulator set.

FIG. 12 illustrates one embodiment of modulation stack including a polarization modulator set. The modulation stack 1200 includes a polarization modulation set 1220, which includes two or more polarization modulators 1230, 1240, 1250. In one embodiment, each polarization modulator 1230, 1240, 1250 modulates one color, such that three modulators modulate the full range of visible light. In one embodiment, each polarization modulator 1230, 1240, 1250 modulates a range of frequencies, such that there may be two or more polarization modulators in the polarization modulator set 1220.

Figure 13A:
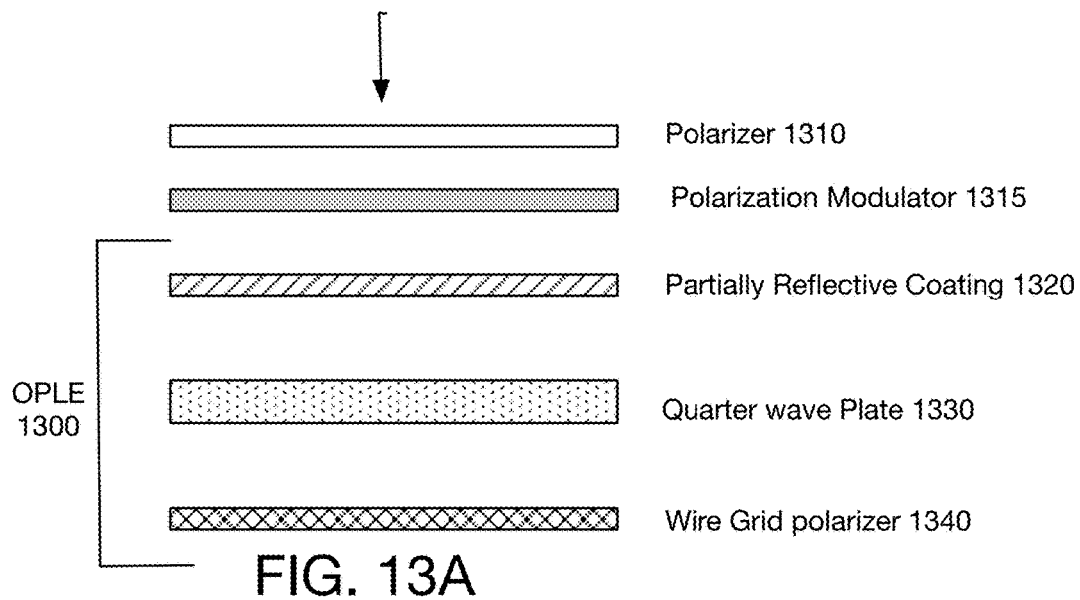
FIG. 13A is an illustration of one embodiment of a longitudinal OPLE.

FIG. 13A illustrates one embodiment of the cross-sectional view of one embodiment of a longitudinal optical path length extender (OPLE). The OPLE includes an entry surface, coated by a partially reflective coating 1320, a quarter wave plate 1330, and a wire grid polarizer 1340. In this example, the light polarization is defined in the direction of propagation.

For light with polarization type two, here C1 (circular polarization type 1), from polarizer 1310, the light passes through polarization modulator 1315, then through the partially reflective coating 1320, passes through the quarter wave plate 1330, and exits through wire grid polarizer 1340. The quarter wave plate 1330 alters the C1 polarization to an L1 polarization, so the exiting light is L1 polarized. This may be an input to another digital light path length modulator.

For light entering the entry surface with polarization C2 (circular polarization of type 2), it is changed to polarization L2 by the quarter wave plate 1330. Light with polarization L2 is reflected by the wire grid polarizer 1340. The light returns through the quarter wave plate 1330, which re-converts it to C2 polarization. It then impacts the partially reflective coating 1320.

The partially reflective coating 1320 reflects a portion of the light, as C1 polarized light, and permits the rest of the light to pass through, as C2 polarized light. The now C1 polarized light passes through the quarter wave plate 1330 one more time, before exiting through the wire grid polarizer as light that is L1 polarized. Thus, the path of the light entering with the C2 polarization is three times the length of the path of light entering with the C1 polarization, since it reflects back up through the OPLE, and down through the OPLE a second time, before exiting. However, there is no lateral shift of the virtual source during this process.

Figure 13B:
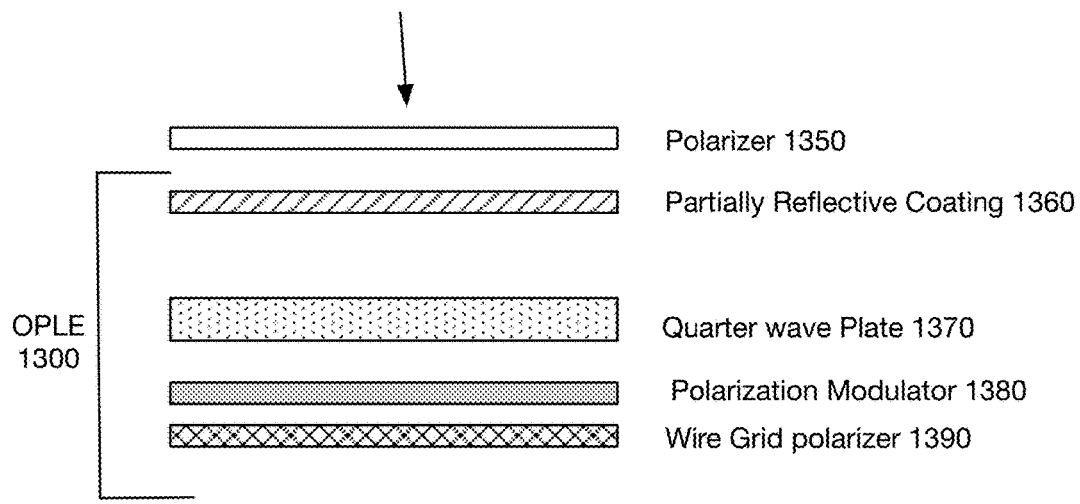
FIG. 13B is an illustration of another embodiment of a longitudinal OPLE.

FIG. 13B illustrates an alternative embodiment of a lateral OPLE. In this embodiment, a polarization modulator is positioned between the waveplate 1370 and the wire grid polarizer 1390.

For light entering the entry surface with polarization type two, here C1 (circular polarization type 1), from polarizer 1350, the light passes through the partially reflective coating 1360, passes through the quarter wave plate 1370, which alters the C1 polarization to an L1 polarization. If the polarization modulator 1380 is not in a rotating state, the exiting light is L1 polarized. This may be an input to another digital light path length modulator.

If the polarization modulator 1380 is in a rotating state, the light is converted to polarization L2 which is reflected by wire grid polarizer 1390. The light returns through the quarter wave plate 1370, which re-converts it to C2 polarization. It then impacts the partially reflective coating 1360.

The partially reflective coating 1360 reflects a portion of the light, as C1 polarized light, and permits the rest of the light to pass through, as C2 polarized light. The now C1 polarized light passes through the quarter wave plate 1370 one more time, before exiting through the wire grid polarizer 1390 as L1 polarized light.

For light with polarization C2 (circular polarization of type 2), it is changed to polarization L2 by the quarter wave plate 1330. If the polarization rotator 1380 is not in a rotating state, light with polarization L2 is reflected by the wire grid polarizer 1390. The light returns through the quarter wave plate 1370, which re-converts it to C2 polarization. It then impacts the partially reflective coating 1360.

The partially reflective coating 1360 reflects a portion of the light, as C1 polarized light, and permits the rest of the light to pass through, as C2 polarized light. The now C1 polarized light passes through the quarter wave plate 1370 one more time, before exiting through the wire grid polarizer 1390 as L1 polarized light.

If the polarization modulator 1380 rotates the L1 polarized light to L2 polarization, it will be reflected by wire grid polarizer 1390. Similarly, if the polarization modulator 1380 rotates the L2 polarized light to L1 polarization, it passes through wire grid polarizer 1390. In one embodiment, this enables the path of the light to be one time the height of the OPLE, three times the height of the OPLE, or a multiple of three times the height of the OPLE, if the polarization modulator 1380 rotates the polarization multiple times.

Figure 14:
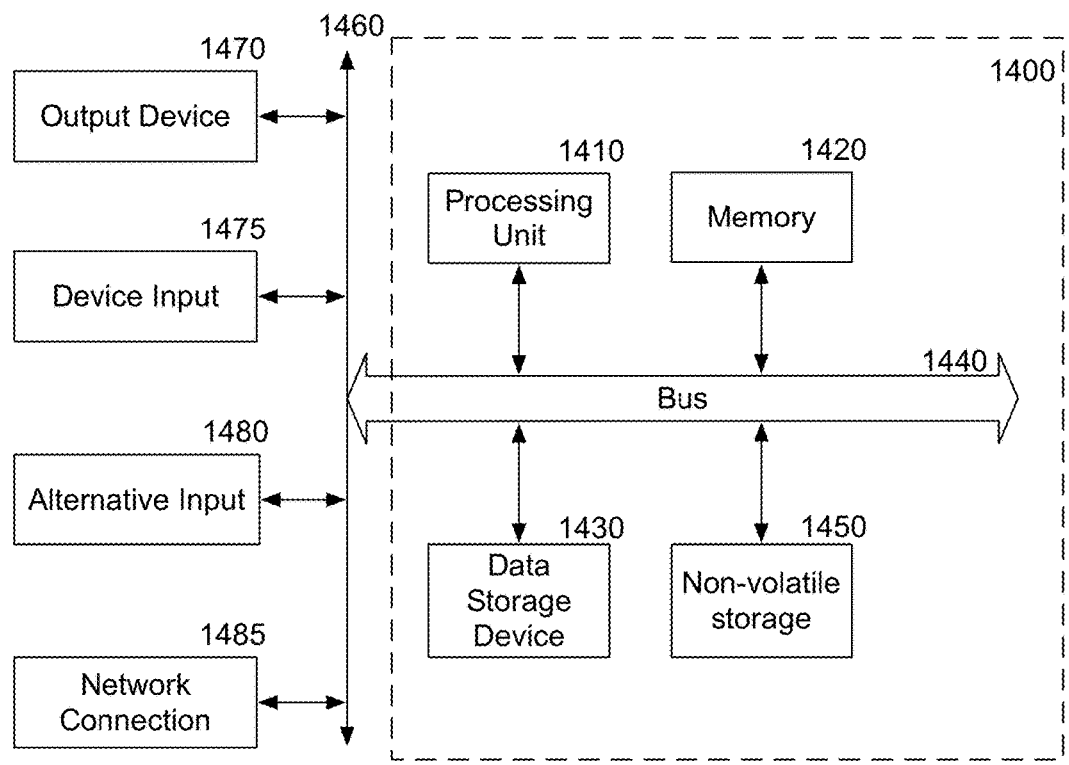
FIG. 14 is a block diagram of one embodiment of a computer system that may be used with the present invention.

FIG. 14 is a block diagram of one embodiment of a computer system that may be used with the present invention. It will be apparent to those of ordinary skill in the art, however that other alternative systems of various system architectures may also be used.

The data processing system illustrated in FIG. 14 includes a bus or other internal communication means 1440 for communicating information, and a processing unit 1410 coupled to the bus 1440 for processing information. The processing unit 1410 may be a central processing unit (CPU), a digital signal processor (DSP), or another type of processing unit 1410.

The system further includes, in one embodiment, a random access memory (RAM) or other volatile storage device 1420 (referred to as memory), coupled to bus 1440 for storing information and instructions to be executed by processor 1410. Main memory 1420 may also be used for storing temporary variables or other intermediate information during execution of instructions by processing unit 1410.

The system also comprises in one embodiment a read only memory (ROM) 1450 and/or static storage device 1450 coupled to bus 1440 for storing static information and instructions for processor 1410. In one embodiment, the system also includes a data storage device 1430 such as a magnetic disk or optical disk and its corresponding disk drive, or Flash memory or other storage which is capable of storing data when no power is supplied to the system. Data storage device 1430 in one embodiment is coupled to bus 1440 for storing information and instructions.

The system may further be coupled to an output device 1470, such as a cathode ray tube (CRT) or a liquid crystal display (LCD) coupled to bus 1440 through bus 1460 for outputting information. The output device 1470 may be a visual output device, an audio output device, an audio-visual device, and/or tactile output device (e.g. vibrations, etc.) The output device 1470 may encompass a plurality of different outputs, such as speakers and microphones, screens and near-eye display devices, etc.

An input device 1475 may be coupled to the bus 1460. The input device 1475 may be an alphanumeric input device, such as a keyboard including alphanumeric and other keys, for enabling a user to communicate information and command selections to processing unit 1410. An additional user input device 1480 may further be included. One such user input device 1480 is cursor control device 1480, such as a mouse, a trackball, stylus, cursor direction keys, or touch screen, may be coupled to bus 1440 through bus 1460 for communicating direction information and command selections to processing unit 1410, and for controlling movement on display device 1470.

Another device, which may optionally be coupled to computer system 1400, is a network device 1485 for accessing other nodes of a distributed system via a network. The network device 1485 may include any of a number of commercially available networking peripheral devices such as those used for coupling to an Ethernet, token ring, Internet, or wide area network, personal area network, wireless network or other method of accessing other devices. The communication device 1485 may further be a null-modem connection, or any other mechanism that provides connectivity between the computer system 1400 and the outside world.

Note that any or all of the components of this system illustrated in FIG. 14 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1420, mass storage device 1430, or other storage medium locally or remotely accessible to processor 1410.

It will be apparent to those of ordinary skill in the art that the system, method, and process described herein can be implemented as software stored in main memory 1420 or read only memory 1450 and executed by processor 1410. This control logic or software may also be resident on an article of manufacture comprising a computer readable medium having computer readable program code embodied therein and being readable by the mass storage device 1430 and for causing the processor 1410 to operate in accordance with the methods and teachings herein.

The present invention may also be embodied in a handheld or portable device containing all or a subset of the computer hardware components described above. For example, the handheld device may be configured to contain only the bus 1440, the processor 1410, and memory 1450 and/or 1420.

The handheld device may be configured to include a set of buttons or input signaling components with which a user may select from a set of available options. These could be considered input device #1 1475 or input device #2 1480. The handheld device may also be configured to include an output device 1470 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1410, a data storage device 1430, a bus 1440, and memory 1420, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1485.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1410. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system to adjust light path length comprising a digital light path length modulator, the digital light path length modulator comprising:
   a polarization modulator to receive polarized light and to modulate a polarization of some or all of the polarized light; and
   an optical path length extender (OPLE) having an entry surface and an exit surface, the OPLE including a plurality of parallel polarization sensitive reflective elements to direct the light entering the OPLE with a first polarization through the entry surface and along a first light path through the OPLE to exit through the exit surface, and to direct the light entering the OPLE with a second polarization through the entry surface and along a second light path through the OPLE to exit through the exit surface, the second light path through the OPLE having a light path length two or more times longer than the first light path length through the OPLE;
   wherein the plurality of parallel polarization sensitive reflective elements are angled, and are designed to reflect the light having the second polarization; and
   the OPLE further comprises blackout lines on a surface of the OPLE, parallel to the polarization sensitive reflective elements to block a portion of the light.

2. The system of claim 1, wherein the blackout lines are positioned on one or more of: an entry surface of the OPLE, on an exit surface of the OPLE, and in a middle of a paired OPLE.

3. The system of claim 1, wherein the blackout lines are made of one of: metal, thin film black carbon, and polarizer material.

4. The system of claim 1, further comprising:
a second polarization modulator.

5. The system of claim 4, wherein the second polarization modulator is on an exit surface of the OPLE, and the polarization modulator and the second polarization modulator each selectively rotate the light.

6. The system of claim 5, further comprising:
a polarization filter after the second polarization modulator, to remove light having a particular polarization.

7. The system of claim 1, further comprising:
the parallel polarization sensitive reflective elements of the OPLE comprising a first plate and a second plate; and
a birefringent waveplate between the first plate of the OPLE and the second plate of the OPLE.

8. The system of claim 7, wherein the waveplate is tuned to a particular frequency.

9. The system of claim 8, further comprising:
a second waveplate tuned to a different frequency from the particular frequency of the birefringent waveplate, wherein a position of the second waveplate is selected from: before a polarization modulator or after the polarization modulator.

10. The system of claim 1, wherein the OPLE is a circular OPLE, and wherein the parallel polarization sensitive reflective elements comprise a plurality of concentric polarization sensitive reflective elements.

11. The system of claim 10, wherein the circular OPLE comprises a round conic section cut from a plurality of stacked cones, each of the plurality of stacked cones having an exterior covered with a polarization sensitive reflective material to form the concentric polarization sensitive reflective elements.

12. The system of claim 1, wherein the OPLE further comprises:
a plurality of angled polarization sensitive reflective elements reflecting the light having the second polarization forming lines on the entry surface of the OPLE, the lines forming a plurality of rectangular areas;
stripes covering alternating rectangular areas, such that image elements with the first polarization are displaced image elements with the second polarization.

13. The system of claim 1, wherein the system is used to project a pattern at a plurality of depths, for optical exposure at multiple layers for use in one or more of: etching and printing.

14. The system of claim 1, wherein the system is used to project light at two focal planes, the light for use as optical tweezers.

15. The system of claim 1, wherein each one of a plurality of OPLEs has a different configuration based on a variation of one or more of: a position of the polarization sensitive reflective elements, a spacing of the polarization sensitive reflective elements, a curvature of the OPLE, an unevenness in the entry surface of the OPLE, an unevenness in an exit surface of the OPLE, an angle of the entry surface of the OPLE, an angle of the exit surface of the OPLE;
wherein the different configurations causes a different reflective pattern output by each of the plurality of OPLEs, which enables use of the OPLE as an optical key.

16. The system of claim 1, wherein the polarization modulator comprises a polarization modulator set including a plurality of polarization modulators, each of the polarization modulators modulating a range of frequencies.

17. A modulation stack comprising:
a polarization modulator to receive polarized light and to modulate a polarization of some or all of the polarized light;
a waveplate; and
an optical path length extender (OPLE) having an entry surface and an exit surface and a plurality of parallel polarization sensitive reflective elements, to direct the light entering the OPLE with a first polarization through the entry surface and along a first light path through the OPLE to exit through the exit surface, and to direct the light entering the OPLE with a second polarization through the entry surface and along a second light path through the OPLE to exit through the exit surface, the second light path through the OPLE having a light path length two or more times longer than the first light path length through the OPLE;
blackout lines on the OPLE, along lines formed by polarization sensitive reflective elements, the blackout lines positioned on one or more of: the entry surface of the OPLE, and the exit surface of the OPLE.

18. The modulation stack of claim 17, further comprising:
the wave plate positioned between two parallel polarization sensitive reflective elements of the OPLE.

19. The system of claim 17, wherein the OPLE further comprises:
a plurality of angled polarization sensitive reflective elements reflecting the light having the second polarization forming lines on the entry surface of the OPLE, the lines forming a plurality of rectangular areas;
stripes covering alternating rectangular areas, such that image elements with the first polarization are displaced image elements with the second polarization.

20. A system to adjust light path length comprising a digital light path length modulator, the digital light path length modulator comprising:
a polarization modulator to receive polarized light and to modulate a polarization of some or all of the polarized light; and
an optical path length extender (OPLE) having an entry surface and an exit surface, the OPLE including a plurality of parallel polarization sensitive reflective elements to direct the light entering the OPLE with a first polarization through the entry surface and along a first light path through the OPLE to exit through the exit surface, and to direct the light entering the OPLE with a second polarization through the entry surface and along a second light path through the OPLE to exit through the exit surface, the second light path through the OPLE having a light path length two or more times longer than the first light path length through the OPLE;
wherein each one of a plurality of OPLEs has a different configuration based on a variation of one or more of: a position of the polarization sensitive reflective elements, a spacing of the polarization sensitive reflective elements, a curvature of the OPLE, an unevenness in the entry surface of the OPLE, an unevenness in an exit surface of the OPLE, an angle of the entry surface of the OPLE, an angle of the exit surface of the OPLE;
wherein the different configurations causes a different reflective pattern output by each of the plurality of OPLEs, which enables use of the OPLE as an optical key.

* * * * *